United States Patent
Tokuchi

(10) Patent No.: US 11,657,023 B2
(45) Date of Patent: *May 23, 2023

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,732

(22) Filed: Oct. 21, 2021

(65) Prior Publication Data

US 2022/0043780 A1 Feb. 10, 2022

Related U.S. Application Data

(63) Continuation of application No. 16/101,532, filed on Aug. 13, 2018, now Pat. No. 11,200,209.

(30) Foreign Application Priority Data

Dec. 1, 2017 (JP) .............................. JP2017-231767

(51) Int. Cl.
    *G06F 16/17* (2019.01)
    *G06F 16/178* (2019.01)
    (Continued)

(52) U.S. Cl.
    CPC .......... *G06F 16/1794* (2019.01); *G06F 9/542* (2013.01); *G06F 16/16* (2019.01)

(58) Field of Classification Search
    CPC ....... G06F 16/1794; G06F 16/16; G06F 9/542
    (Continued)

(56) References Cited

U.S. PATENT DOCUMENTS 5,341,476 A * 8/1994 Lowell ................. H04L 69/329
                                                  709/219
8,615,773 B2 * 12/2013 Bishop .................... G06F 9/542
                                                  719/318

(Continued)

FOREIGN PATENT DOCUMENTS

| JP | 2003316770 | 11/2003 |
| JP | 2006325203 | 11/2006 |
| JP | 6052459    | 12/2016 |

OTHER PUBLICATIONS

Office Action of Japan Counterpart Application, with English translation thereof, dated Oct. 19, 2021, pp. 1-8.

(Continued)

*Primary Examiner* — Hanh B Thai
(74) *Attorney, Agent, or Firm* — JCIPRNET

(57) ABSTRACT

An information processing apparatus includes a processor configured to receive an operation performed by a user on an image associated with a designated file, and in response to the operation is an instruction related to an execution of a coordinated function, display a list of candidates for the coordinated function which is executable by using the designated file and display a list of files, which are different from the file, used for executing the coordinated function along with the designated file.

16 Claims, 10 Drawing Sheets

< COORDINATED FUNCTION MANAGEMENT TABLE >

|  | USER A | USER B |
|---|---|---|
| COORDINATED FUNCTION 1 | FILE 1 | FILE 2 |
| COORDINATED FUNCTION 2 | FILE 2 | FILE 1 |
| COORDINATED FUNCTION 3 | FILE 3 | FILE 4 |
| ... | ... | ... |

(51) Int. Cl.
*G06F 9/54* (2006.01)
*G06F 16/16* (2019.01)

(58) Field of Classification Search
USPC .......................................................... 707/822
See application file for complete search history.

(56) References Cited

U.S. PATENT DOCUMENTS

| | | | |
|---|---|---|---|
| 9,298,716 B2* | 3/2016 | Oda .................... | G06F 16/5866 |
| 11,151,022 B1* | 10/2021 | Kuo .......................... | G06F 8/60 |
| 2004/0111672 A1* | 6/2004 | Bowman ................. | G06F 9/451 |
| | | | 715/255 |
| 2009/0063571 A1* | 3/2009 | Narimatsu .............. | G06F 16/16 |
| 2018/0096230 A1* | 4/2018 | Luan ........................ | G06T 7/60 |

OTHER PUBLICATIONS

"Office Action of Japan Counterpart Application", dated Oct. 19, 2021, with English translation thereof, p. 1-p. 8.

\* cited by examiner

FIG.3

<COORDINATED FUNCTION MANAGEMENT TABLE>

| COMBINATION OF FILE FORMATS | COORDINATED FUNCTION |
|---|---|
| DOCUMENT FORMAT, TABLE FORMAT | • INSERT TABLE INTO DOCUMENT<br>• INSERT DOCUMENT INTO TABLE |
| DOCUMENT FORMAT, IMAGE FORMAT | • INSERT IMAGE INTO DOCUMENT<br>• SUPERIMPOSE DOCUMENT ON IMAGE |
| DOCUMENT FORMAT, VIDEO FORMAT | • INSERT VIDEO INTO DOCUMENT<br>• INSERT STILL IMAGE INTO DOCUMENT |
| DOCUMENT FORMAT, DOCUMENT FORMAT | • ADD CONTENT OF ONE DOCUMENT TO ANOTHER DOCUMENT |
| TABLE FORMAT, TABLE FORMAT | • ADD ONE TABLE TO ANOTHER TABLE |
| VIDEO FORMAT, VIDEO FORMAT | • ADD ONE VIDEO TO ANOTHER VIDEO |
| SHEET FORMAT, DOCUMENT FORMAT | • INSERT DOCUMENT INTO PRESENTATION SHEET |
| ... | ... |

FIG.14

<COORDINATED FUNCTION MANAGEMENT TABLE>

|  | USER A | USER B |
|---|---|---|
| COORDINATED FUNCTION 1 | FILE 1 | FILE 2 |
| COORDINATED FUNCTION 2 | FILE 2 | FILE 1 |
| COORDINATED FUNCTION 3 | FILE 3 | FILE 4 |
| ... | ... | ... |

FIG.15

<COORDINATED FUNCTION MANAGEMENT TABLE>

| COMBINATION OF FILE FORMATS | ACQUISITION ORDER | COORDINATED FUNCTION + PRIORITY |
|---|---|---|
| DOCUMENT FORMAT, TABLE FORMAT | DOCUMENT → TABLE | ①INSERT DOCUMENT INTO TABLE<br>②INSERT TABLE INTO DOCUMENT |
| | TABLE → DOCUMENT | ①INSERT TABLE INTO DOCUMENT<br>②INSERT DOCUMENT INTO TABLE |
| DOCUMENT FORMAT, IMAGE FORMAT | DOCUMENT → IMAGE | ①SUPERIMPOSE DOCUMENT ON IMAGE<br>②INSERT IMAGE INTO DOCUMENT |
| | IMAGE → DOCUMENT | ①INSERT IMAGE INTO DOCUMENT<br>②SUPERIMPOSE DOCUMENT ON IMAGE |
| DOCUMENT FORMAT, VIDEO FORMAT | DOCUMENT → VIDEO | ①SUPERIMPOSE DOCUMENT ON VIDEO<br>②INSERT VIDEO INTO DOCUMENT |
| | VIDEO → DOCUMENT | ①INSERT VIDEO INTO DOCUMENT<br>②SUPERIMPOSE DOCUMENT ON VIDEO |
| ... | ... | ... |

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is a continuation applications of and claims the priority benefit of a prior application Ser. No. 16/101,532 filed on Aug. 13, 2018, now allowed. The prior application Ser. No. 16/101,532 claims the priority benefit of Japanese Patent Application No. 2017-231767 filed Dec. 1, 2017. The entirety of each of the above-mentioned patent applications is hereby incorporated by reference herein and made a part of this specification.

BACKGROUND

Technical Field

The present invention relates to an information processing apparatus, a non-transitory computer readable medium, and an information processing method.

SUMMARY

According an aspect of the present invention, there is provided an information processing apparatus including a processor configured to receive an operation performed by a user on an image associated with a designated file, and in response to the operation is an instruction related to an execution of a coordinated function, display a list of candidates for the coordinated function which is executable by using the designated file and display a list of files, which are different from the file, used for executing the coordinated function along with the designated file.

BRIEF DESCRIPTION OF THE DRAWINGS

Exemplary embodiments of the present invention will be described in detail based on the following figures, wherein:

FIG. 3 is a diagram illustrating a coordinated function management table;

FIG. 14 is a diagram illustrating a coordinated function management table;
and
FIG. 15 is a diagram illustrating a coordinated function management table.

DETAILED DESCRIPTION

Figure 1:
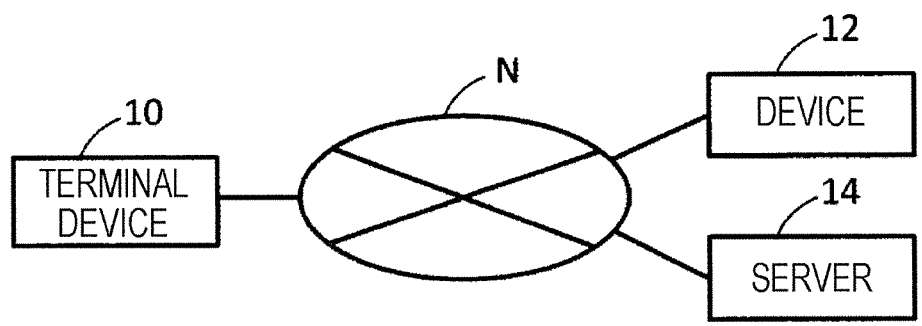
FIG. 1 is a block diagram illustrating the configuration of an information processing system according to an exemplary embodiment of the present invention.

An information processing system according to an exemplary embodiment of the present invention will be described with reference to FIG. 1, which illustrates an example of an information processing system according to an exemplary embodiment.

The information processing system according to the present exemplary embodiment includes a terminal device 10, a device 12, and a server 14 as an example. In the example illustrated in FIG. 1, the terminal device 10, the device 12, and the server 14 have a function of communicating with one another via a communication path N such as a network. Of course, the terminal device 10, the device 12, and the server 14 may communicate with one another via a different communication path without using the communication path N, or may directly communicate with other devices. Further, plural terminal devices 10, plural devices 12, and plural servers 14 may be included in the information processing system, and the device 12 and the server 14 may not be included in the information processing system.

The terminal device 10 is a device such as a personal computer (PC), a tablet PC, a smartphone, or a mobile phone, and has a function of transmitting/receiving data to/from another device. The terminal device 10 may be a wearable terminal (a wristwatch type terminal, a wristband type terminal, a spectacle type terminal, a ring type terminal, a contact lens type terminal, an intracorporeal embedded terminal, a hearable terminal, etc.). In addition, the terminal device 10 may have a flexible display as a display device. As the flexible display, an organic electroluminescence type display (flexible organic EL display), an electronic paper type display, a flexible liquid crystal display, and the like are used. A flexible display that adopts a different display format may be used. The flexible display is a display with a flexibly-deformable display portion which may be, for example, bent, folded, rolled, twisted, or stretched. The terminal device 10 may be entirely constituted by a flexible display or may be constituted by a flexible display and other components which are functionally or physically separated from each other.

The device 12 is a device having a function and is, for example, an image forming device having an image forming function (at least one function of a scanning function, a printing function, a copying function, a facsimile function, etc.), a PC, a tablet PC, a smartphone, a mobile phone, a robot (a humanoid robot, an animal robot, other robots, etc.), a display device such as a projector and a liquid crystal display, a recording device, a reproducing device, an image capturing device such as a camera, a refrigerator, a rice cooker, a microwave oven, a coffee maker, a vacuum cleaner, a washing machine, an air conditioner, a lighting device, a clock, a surveillance camera, an automobile, a motorcycle, an aircraft (e.g., an unmanned aerial vehicle (so-called drone)), a game machine, various sensing devices (e.g., a temperature sensor, a humidity sensor, a voltage sensor, a current sensor, etc.), and the like. The device 12 may be a device that provides an output to a user (e.g., an image forming device or a PC), or may be a device that does not provide an output to a user (e.g., a sensing device). In addition, all of the devices that perform the coordinated function described below may be devices that provide an output to a user, some devices may be devices that provide an output to a user and other devices may be devices that do not provide an output to a user, or all of the devices may be devices that do not provide an output to a user. The category of the concept of the device 12 may include the general devices. For example, information equipment, video equipment, audio equipment, and other equipment may be included in the category of the device according to the present exemplary embodiment. Further, the device 12 has a function of transmitting/receiving data to/from other devices.

The server 14 is a device that manages data and user information, and manages the device 12. In addition, the server 14 has a function of transmitting/receiving data to/from other devices.

In the present exemplary embodiment, when plural files (data) are acquired (collected), the notification of a coordinated function that is executable with the contents of the plural files is controlled. The notification is made by, for example, the terminal device 10 or the device 12. Of course, the notification may be made by other devices. The acquisition (collection) of plural files may be performed by the terminal device 10, by the device 12, or by the server 14. For example, when all of plural files are acquired by the terminal device 10 or the server 14, the coordinated function is notified. That is, when the terminal device 10 acquires plural files, the coordinated function may be notified, and when the server 14 acquires plural files, the coordinated function may be notified. Of course, when the device 12 acquires plural files, the coordinated function may be notified. That is, any of the terminal device 10, the device 12, and the server 14 may function as an information processing apparatus. Further, when some files included in the plural files are acquired by the terminal device 10 and other files are acquired by the server 14, the coordinated function may be notified. The coordinated function will be explained in detail later.

Figure 2:
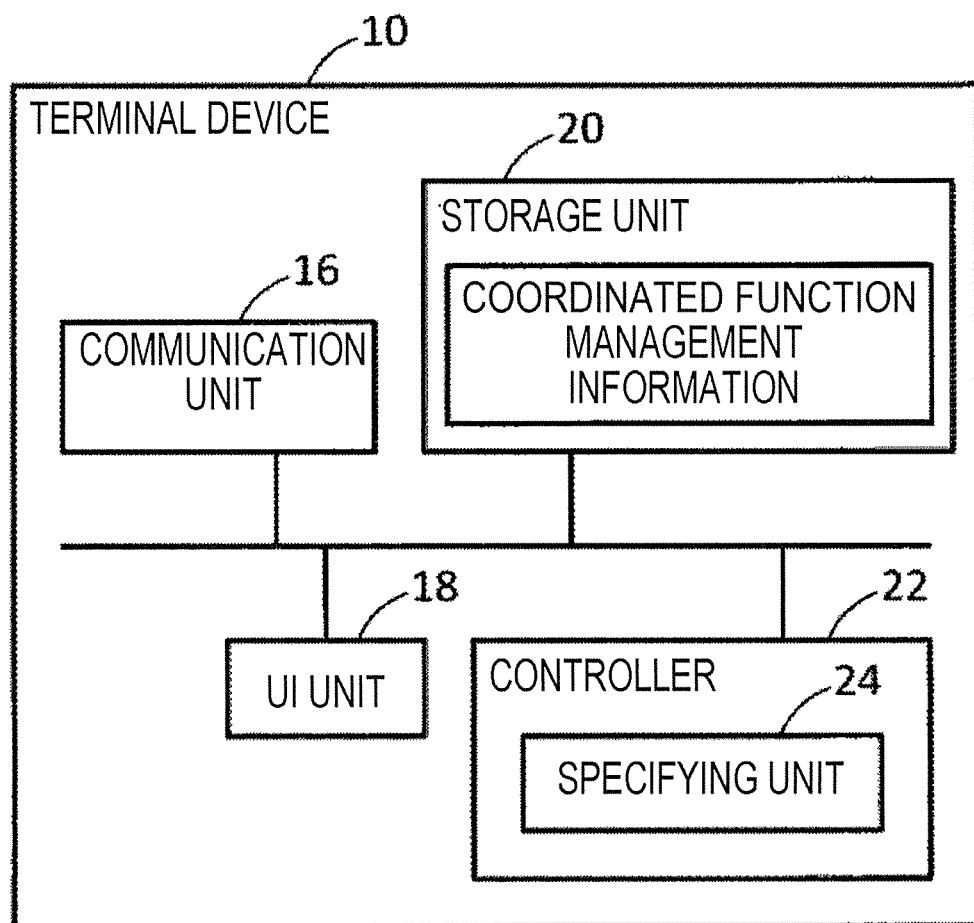
FIG. 2 is a block diagram illustrating the configuration of a terminal device.

Hereinafter, the configuration of the terminal device 10 will be described in detail with reference to FIG. 2.

A communication unit 16 is a communication interface, and has a function of transmitting data to other devices and a function of receiving data from other devices. The communication unit 16 may be a communication interface having a wireless communication function or a communication interface having a wired communication function. The communication unit 16 corresponds to one or more types of communication methods and may communicate with a communication partner according to a communication method suitable for the communication partner (i.e., a communication method to which the communication partner corresponds). The communication method includes, for example, infrared communication, visible light communication, Wi-Fi (registered trademark) communication, and proximity wireless communication (e.g., near-field communication (NFC), etc.). Felica (registered trademark), Bluetooth (registered trademark), a radio frequency identifier (RFID), and the like are used for the proximity wireless communication. Of course, a wireless communication in another method may be used for the proximity wireless communication. The communication unit 16 may switch the communication method or the frequency bandwidth depending on the communication partner, or may switch the communication method or the frequency bandwidth depending on the surrounding environment.

A UI unit 18 is a user interface unit and includes a display unit and an operation unit. The display unit is, for example, a display device such as a liquid crystal display. The display unit may be a flexible display. The operation unit is, for example, an input device such as a touch panel or a keyboard. A user interface serving as both a display unit and an operation unit (e.g., a touch type display or a device that electronically displays a keyboard or the like on a display) may be used. In addition, the UI unit 18 may include a sound collecting unit such as a microphone and a sound generating unit such as a speaker. In this case, information may be input to the terminal device 10 by voice, or information may be generated as voice.

A storage unit 20 is a storage device such as a hard disk or a memory (e.g., an SSD). The storage unit 20 stores coordinated function management information, various types of data, various programs (e.g., an operating system (OS), various application programs (application software), etc.), information indicating the addresses of other devices (e.g., the device 12) (device address information), information indicating the address of a server 14 (server address information), information on the coordinated function, and the like. Of course, the information may be stored in separate storage devices or may be stored in a single storage device.

Hereinafter, the coordinated function management information will be described in detail. Coordinated function management information is information for managing a coordinated function. The coordinated function is a function that is executable with the contents of plural files (data). A file is, for example, a document file, an image file, a video file, a table file, a presentation file, a figure (drawing) file, a voice file, or the like. Of course, the coordinated function may be executed for files other than those files.

A document file is a file having a document format, and is a file composed of character strings and other information. Images, tables, and figures may be included in the document file as other information. The document format is, for example, a text format or a document format. Data having a text format (e.g., data associated with a character string ".txt" as an extension), data having a document format (e.g., data associated with a character string ".doc" or ".docx" as an extension), or the like corresponds to the document file.

An image file is a file having an image forming (image format). The image file may be image data having a raster format, or image data having a vector format. The image format is, for example, a JPEG format, a BMP (bit map) format, a PDF format, a GIF format, a TIFF format, a PNG format, a PICT format, or the like. Data having the JPEG format (data associated with a character string ".jpeg" as an extension), data having the BMP format (data associated with a character string ".bmp" as an extension), data having the PDF format (data associated with a character string ".pdf" as an extension), data having the GIF format (data associated with a character string ".gif" as an extension), data having the TIFF format (data associated with a character string ".tiff" as an extension), data having the PNG format (data associated with a character string ".png" as an extension), data having the PICT format (data associated with a character string ".pict" as an extension), and the like correspond to the image files. Of course, image data having a format other than those described above may be used as an image file according to the present exemplary embodiment.

A video file is a file having a video format. The video format is, for example, an AVI format, an MP4 format, a MOV format, an MPEG2-TS format, an MPEG2-PS format, a WMV format, an FLV format, or the like. Data having the AVI format (data with a character string ".avi" as an extension), data having the MP4 format (data with a character string ".mp4" as an extension), data having the MOV format (data with a character string ".mov" as an extension), data having the MPEG2-TS format (data with a character string ".m2ts" as an extension), data having the MPEG2-PS format (data with a character string ".mpeg" as an extension), data having the WMV format (data with a character string ".wmv" as an extension), data having the FLV format (data with a character string ".flv" as an extension), and the like correspond to the video files. Of course, video data having a format other than those described above may be used as a video file according to the present exemplary embodiment.

A table file is a file having a table format, and is a file composed of tables, graphs, and other information. Character strings, images, and figures may be included in the table file as other information. For example, the table file is data that is associated with a character string ".csv," ".xls," or ".xlsx" as an extension.

The presentation file is a file that has a sheet format for presentation. For example, data that is associated with a character string ".ppt" or ".pptx" as an extension corresponds to the presentation file. The presentation file is configured with, for example, a character string, an image (a still image or a moving image), a figure, voice, or the like.

A figure file is a file having a figure (drawing) format. The figure file is a file created by a figure drafting software (e.g., two-dimensional CAD, three-dimensional CAD, or the like). The figure file is, for example, data having a DXF format (data associated with a character string ".dxf" as an extension), data having a DWG format (data associated with a character string ".dwg" as an extension), or the like. In addition, data associated with ".vsd" or ".vsdx" as an extension may be considered as the figure file.

A voice file is a file having a voice format. The voice format is, for example, a non-compressed voice format (a WAV format, an AIFF format, a BWF format, etc.), an irreversible compressed voice format (an mp3 format, an AAC format, a WMA format, etc.), a reversible compressed voice format (a TAK format, a FLAC format, etc.), or the like. Data having the non-compressed voice format (data associated with ".wav," etc. as an extension), data having the irreversible compressed voice format (data associated with the character string ".mp3," etc. as an extension), data having the non-compressed voice format (data associated with the character string ".tak," etc. as an extension), and the like correspond to the voice files.

The coordinated function is a function that is executable with one or more functions. The function may be implemented by a device serving as hardware, or may be implemented by software (program). In other words, devices and software are used to execute the coordinated function. The coordinated function may be executed by a single device or may be executed by coordinating plural devices with one another. Similarly, the coordinated function may be executed by a single piece of software, may be executed by coordinating plural pieces of software with one another. The coordinated function may be also executed by coordinating one or more devices with one or more pieces of software.

Further, the coordinated function may be a function that is executable with a specific portion of a device or a specific function of software. For example, when a function is assigned to each portion of a device, the coordinated function may be a function that is executable by using the portion. In addition, when the software has plural functions, the coordinated function may be a function that uses some of the plural functions. The coordinated function may also be a function that uses a collective function configured by the plural functions. In the collective function, the plural functions are executed simultaneously or sequentially so that a processing by the collective function is executed.

For example, the coordinated function is defined for each file format (type, attribute). coordinated function management information is information indicating an association between information indicating a combination of the formats (types, attributes) of plural files, and information indicating the content of the coordinated function that is executable with the contents of the plural files (coordinated function information), as an example. The file format (type, attribute) is, for example, the document format, the image format, the video format, table format, the sheet format, the figure format, the voice format, or the like as described above.

The coordinated function management information may be information that indicates an association between information indicating a combination of the names (file names) of plural files and the coordinated function information indicating the coordinated function that is executable with the contents of the plural files.

In addition, information for identifying the device used for the coordinated function (device identification information) and information for identifying the software used for the coordinated function (software identification information) may be associated with the coordinated function information to be registered in the coordinated function management information.

When a function used for a coordinated function is updated (e.g., when the performance of software or a device for implementing the function is updated), the coordinated function is updated along with the update, and as a result, the coordinated function management information is also updated. In some cases, as a result, after the update, a coordinated function becomes available with plural functions, which otherwise cannot be coordinated with one another before the update, or contrarily, a coordinated function available before the update becomes unavailable after the update. Coordinated function information indicating the coordinated function that has become available after the update is registered in the coordinated function management information, and coordinated function information indicating the coordinated function that becomes unavailable after the update is deleted from the coordinated function management information or registered as unavailable information. The terminal device 10 may update the coordinated function management information by arbitrary timing, periodically, by a timing designated by a user, or the like.

The coordinated function may be a function that is executable by coordinating plural different functions (e.g., different devices or pieces of software) with one another, or a function that is executable by coordinating plural identical functions (e.g., the same device or software) with one another. The coordinated function may be a function that was not available before the coordination. The function that was not available before the coordination may be a function that becomes available by coordinating plural identical functions with one another, or a function that becomes available by combining plural different functions with one another. For example, by coordinating a document creation function (document creation software) with an image display function (image display software (e.g., image viewer)), it becomes possible to insert (attach) an image into (to) a document and to superimpose a document (a character string or a text) on the image as a coordinated function. That is, an image insertion function and a text superimposition function may be executed by coordinating the document creation function with the image display function.

The category of the concept of the coordinated function may include a merging function that enables the execution of new functions by coordinating plural devices or plural pieces of software with one another. For example, an extended display function as the merging function may be implemented by combining plural displays with one another. As another example, a recording function as the merging function may be implemented by combining a television with a recorder. The recording function is a function of recording the image displayed on the television. In addition, a capturing area expanding function as the merging function may be implemented by combining plural cameras with one another. The expanding function is a function of connecting and capturing, for example, the capturing areas of the respective cameras. In addition, a conversation translating function (a function of translating a conversation via a telephone) as the merging function may be implemented by combining a telephone with a translator or translation software. In this manner, the category of the concept of the coordinated function includes a function that may be implemented by coordinating the same type of devices or software with one another, or a function that may be implemented by coordinating different types of devices or software with one another.

The storage unit 20 may store available function management information. The available function management information is information for managing functions available to each user. The available function management information is, for example, information indicating an association between information for identifying a user (user identification information) and function information indicating the functions available to the user (including coordinated function information). The functions available to the user are, for example, the functions provided free of charge to the user, the functions purchased by the user, and the like. The user identification information is, for example, user account information such as a user ID and a user name. By referring to the available function management information, functions available to each user are specified (identified). The available function management information is updated, for example, every time the function is provided to the user free of charge or for a fee.

The time at which the coordinated function is executed (execution time) may be set so that the execution time may be associated with each coordinated function in the coordinated function management information. The execution time is determined by the day of the week, the time zone (e.g., the time zone is set by the start time and the end time), the day, the week, the month, and the like. The execution time may be set by the user or may be predetermined. The execution time may be set individually for each coordinated function, or the same execution time may be set for all coordinated functions. In a case where an instruction to execute the coordinated function is given by the user, when the time at which the execution instruction is given (the day of the week, the time zone, etc.) is included in the execution time set for the coordinated function, the coordinated function is executed. When the time at which the execution instruction is given is not included in the execution time, the coordinated function is not executed. In this case, assuming that the execution instruction has already been given, the coordinated function may be executed when the execution time has come.

Further, each device may be directly or indirectly controlled by the terminal device 10. For example, the terminal device 10 may directly control the device by transmitting a control signal to the device to control an operation thereof, or control the device via a relay device by transmitting a control signal to the relay device. When the relay device is used, the relay device controls the device according to, for example, the control signal transmitted from the terminal device 10. The relay device that receives the control signal from the terminal device 10 may transmit the control signal to the other relay device so that the other relay device may control the device. Further, the device may be controlled by transmitting the control signal to the other relay device, or the device may be controlled via a server 14 by transmitting the control signal from the relay device to the server 14. The relay device may be a so-called smart speaker (a device that has a wireless communication function and a speaker function), or a device that has a communication device but does not have a speaker function. The relay device may be installed indoors (e.g., on the floor, on the ceiling, on the top of a table, etc.) or outdoors. Also, the relay device may be a movable device (e.g., a self-propelled device). The device itself may function as a relay device.

A controller 22 has a function of controlling the operation of each portion of the terminal device 10. For example, the controller 22 executes various programs, controls communication by a communication unit 16, controls a notification of information using a UI unit 18 (e.g., display of information, output of voice, etc.), receives the information that has been input using the UI unit 18, and the like. Further, the controller 22 includes a specifying unit 24.

The specifying unit 24 has a function of referring to the coordinated function management information and thus specifying a coordinated function executable with the contents of plural files to be subjected to coordination. For example, the specifying unit 24 specifies, with reference to the coordinated function management information, a coordinated function that is associated with a combination of the formats (types) of the plural files to be subjected to coordination. The specifying unit 24 may specify, with reference to the coordinated function management information, a coordinated function that is associated with a combination of the formats (types) of the plural files to be subjected to coordination.

When the file is acquired (collected), the specifying unit 24 identifies the file as a file to be subjected to coordination. For example, the file is acquired via an e-mail, a social networking service (SNS), other communication methods, a recording medium (a memory such as a USB memory or other memory card, a magnetic recording medium, an optical disk, etc.), or the like. For example, when the terminal device 10 acquires (collects) the file via an e-mail, an SNS, a recording medium, or the like, the specifying unit 24 identifies the file as a file to be subjected to coordination. Moving a file between logical layers of a recording medium may also be treated as acquisition (collection) of the file. For example, when a file is stored in a storage area (e.g., drive C) in the hard disk drive (HDD) and the file is sent to another storage area (e.g., drive D), the specifying unit 24 may identify the file as a file to be subjected to coordination. In addition, the specifying unit 24 may identify the file displayed in a specific display area on the screen as a file to be subjected to coordination. Also, when a file is stored in a specific storage area or displayed in a specific display area, another file that is a target of a coordinated function together with the file is sent to the specific storage area. Alternatively, when a file is displayed in the specific display area, the specifying unit 24 may identify the file as a file to be subjected to coordination.

When the coordinated function is specified by the specifying unit 24, the controller 22 controls the notification of the coordinated function. For example, the controller 22 may cause information indicating the coordinated function to be displayed on a display unit of the UI unit 18, or may output voice information indicating the coordinated function. The controller 22 may also control the execution of the coordinated function specified by the specifying unit 24. In addition, the controller 22 may control the notification of the coordinated function using a device other than the terminal device 10.

When the available function of the user is managed, the specifying unit 24 may receive the user identification information and specify a function associated with the user identification information in the available function management information stored in the storage unit 20. For example, the specifying unit 24 receives the identification information of the user logged in to the terminal device 10, specifies the function associated with the user identification information in the available function management information, and specifies the coordinated function that is executable with the contents of the plural files to be subjected to coordination. As a coordinated function associated with the user identification information in the available function management information, the coordinated function that is executable with the contents of the plural files to be subjected to coordination is a coordinated function that the user may use.

The coordinated function management information may be stored in an external device such as the device 12 and the server 14. In this case, the coordinated function management information may not be stored in the storage unit 20. Further, the specifying unit 24 may be provided in an external device. In this case, the specifying unit 24 may not be provided in the terminal device 10. That is, the management and specification processing of the coordinated function may be performed by the terminal device 10 or by an external device. When the specification processing is performed by the external device, the result of the processing (e.g., information indicating the specified coordinated function) is transmitted from the external device to the terminal device 10 and displayed on the display unit of the UI unit 18.

Hereinafter, the information processing system according to the present exemplary embodiment will be described in more detail.

The coordinated function management information will be described in detail with reference to FIG. 3. FIG. 3 illustrates an example of a coordinated function management table as coordinated function management information. As an example, in the coordinated function management table, information indicating a combination of plural file formats (file types) and information indicating the contents of the coordinated function that is executable with the contents of plural files (coordinated function information) are associated with one another. For example, when plural files are acquired (collected), the specifying unit 24 specifies a coordinated function associated with the combination of the plural file formats in the coordinated function management table. The controller 22 causes, for example, information on the specified coordinated function (e.g., information indicating the contents or explanation of the coordinated function, etc.) to be displayed on the display unit of the UI unit 18.

In the example illustrated in FIG. 3, a combination of two file formats and a coordinated function are associated with one another, but a combination of three or more file formats and a coordinated function may be associated with one another to be registered in the coordinated function management table.

Further, information indicating a combination of the names (file names) of plural files and information indicating the coordinated function that is executable with the contents of the plural files may be associated with one another to be registered in the coordinated function management table.

In addition, the device identification information for identifying the device used in the coordinated function and the software identification information for identifying the software used in the coordinated function may be associated with the coordinated function information to be registered in the coordinated function management table.

Examples of the device identification information include, for example, information indicating the device name, the device ID, and the device type, the type number of the device, information for managing the device (e.g., asset management information, etc.), information indicating a position where the device is installed (positional information of the device), an image connected to the device (device image), device address information, and the like. The device image is, for example, an external image representing the device. The external image may be an image that represents the outside of the device (e.g., a housing of the device), an image that represents a state in which the inside may be seen from the outside by opening the housing (e.g., an internal structure), or an image that represents a state in which the device is covered by a sheet for packing or the like. The device image may be an image that is generated by capturing the device (an image representing an external appearance of the device or an image representing the inside of the device), or an image that schematically represents the device (e.g., an icon, etc.). The device image may be a still image or a moving image. The data of the device image may be stored in the storage unit 20 or in an external device such as the device 12 or the server 14.

Examples of the software identification information include, for example, information indicating the software name, the software ID, and the software type, the type number of the software, information for managing the software, an image connected to the software (software image), and the like. The software image is, for example, an image representing the function of the software (e.g., an icon, etc.). The software image may be a still image or a moving image. The data of the software image may be stored in the storage unit 20 or in an external device such as the device 12 or the server 14.

Hereinafter, each of the coordinated functions illustrated in FIG. 3 will be described. The "document format" in FIG. 3 is a text format (where the extension is ".txt") or a document format (where the extension is ".doc" or ".docx"). The "table format" is a format in which the extension is represented by ".csv," ".xls," or the like. The image format is a format in which the extension is represented by ".jpeg," ".pdf," or the like. The video format is a format in which the extension is represented by ".avi," ".mpeg," or the like. The sheet format is a format in which the extension is represented by ".ppt" or the like. FIG. 3 does not illustrate a figure format or a voice format, but an association between a combination including these formats and coordinated functions may be registered in the coordinated function management table. Of course, an association between a combination including the file formats other than the file formats illustrated in FIG. 3 and coordinated functions may be specified and registered in the coordinated function management table.

Hereinafter, each of the coordinated functions illustrated in FIG. 3 will be described. When a document file and a table file are identified as files to be subjected to coordination, a "function of inserting a table into a document" and a "function of inserting a document into a table," which are associated with a combination of the document format and the table format, are specified as coordinated functions. The "function of inserting a table into a document" is a function of inserting a table represented by a table file into a document represented by a document file. The "function of inserting a document into a table" is a function of inserting a document represented by a document file into a table represented by a table file.

When a document file and an image file are identified as files to be subjected to coordination, a "function of inserting an image into a document" and a "function of superimposing a document on an image," which are associated with a combination of the document format and the image format, are specified as coordinated functions. The "function of inserting an image into a document" is a function of inserting an image represented by an image file into a document represented by a document file. The "function of superimposing a document on an image" is a function of superimposing a document represented by a document file on an image represented by an image file.

When a document file and a video file are identified as files to be subjected to coordination, a "function of inserting a video into a document" and a "function of inserting a still image into a document," which are associated with a combination of the document format and the video format, are specified as coordinated functions. The "function of inserting a video into a document" is a function of inserting a video represented by a video file into a document represented by a document file. The "function of inserting a still image into a document" is a function of inserting one or more frames (still images) constituting a video file into a document represented by a document file. For example, in the case of a document file that does not correspond to a video, that is, a file into which a video may not be inserted, when the "function of inserting a still image into a document" is executed, one or more frames (still images) in the video file are inserted into the document represented by the document file.

Plural files having the same file format may be used as the files to be subjected to coordination. In this case, a function of merging files is specified as a coordinated function. The function of merging files is a function of merging the contents of plural files. Another file may be merged into one file to delete the other file, and a new file may be created in which the plural files are merged while leaving the plural files.

For example, when the plural document files are identified as files to be subjected to coordination, a "function of adding the contents of one document to the other document," which is associated with a combination of the document formats, is specified as a coordinated function.

When plural table files are identified as files to be subjected to coordination, a "function of adding one table to the other table," which is associated with a combination of the table formats, is specified as a coordinated function.

When plural video files are identified as files to be subjected to coordination, a "function of adding one video to the other video," which is associated with a combination of the video files, is specified as a coordinated function.

In addition, when a presentation file and a document file are identified as files to be subjected to coordination, a "function of inserting a document into a presentation sheet," which is associated with a combination of the sheet format and the document format, is specified as a coordinated function. The "function of inserting a document into a presentation sheet" is a function of inserting a document represented by a document file into a sheet represented by a presentation file.

The coordinated function illustrated in FIG. 3 is merely an example. A coordinated function that is executable with a device or software may be registered in the coordinated function management table. In addition, the coordinated function may be a function that is executable with an Internet of Things (IoT) device. The coordinated function may be used in, for example, a connected home (a system in which devices such as home appliances are connected via a network using the IoT technology). In this case, the devices may be connected via a specific server, or without a specific server. Further, the device and the software may be coordinated with one another via the IFTTT to execute the coordinated function. That is, when the contents of the coordinated function are triggered by a device or software, other devices or software may perform an action (processing). Further, when the contents of the coordinated function are triggered by a file, the action (processing) may be performed on another file. In addition, a function of causing an action to become another trigger and performing another action may be included in the category of the coordinated function of the present exemplary embodiment. Moreover, a function of coordinating plural Web services and an application programming interface (API) coordination of coordinating plural systems, services, or the like using the API may be included in the category of the coordinated function of the present exemplary embodiment.

As for the device, the portions of the device may be used. For example, when a device has plural functions and the function is assigned to each portion of the device, a coordinated function using the portion of the device may be defined. As a specific example, it is assumed that a printing function is assigned to a main body unit of a multifunction device, a scanning function is assigned to a reading unit of the multifunction device (e.g., a portion corresponding to a document cover, a document glass, or an automatic document feeder), and a post-processing function (e.g., a stapling function, etc.) is assigned to a post-processing device of the multifunction device. When the scanning function is used as a function included in the coordinated function, the reading unit of the multifunction device may be designated as a portion of the device required for the coordinated function. In addition, a collective function integrated in a block unit such as robotics process automation (RPA) may be used as software.

The coordinated function registered in the coordinated function management table may be created and registered in advance or by the user.

The device used for the coordinated function may be the device included in the information processing system or the device not included in the information processing system. The software used for the coordinated function may be software installed in the terminal device 10, or software installed in an external device such as the device 12 or the server 14. The coordinated function may be executed using plural pieces of software installed on both the terminal device 10 and the external device.

Also, the terminal device 10 may update the coordinated function management table at any timing, periodically, at a timing designated by a user or an administrator, or the like. When the coordinated function management table is stored in an external device such as the device 12 or the server 14, the coordinated function management table may be updated by the external device. The updating may add a new coordinated function to the coordinated function management table, change the contents or configuration of the coordinated function already registered in the coordinated function management table, or delete a coordinated function from the coordinated function management table. For example, when a function of the device registered in the coordinated function management table or a function of the software is updated, the content of the coordinated function using the updated function may be updated along with the update. In addition, after the update, a coordinated function may become available with plural components, which otherwise cannot be coordinated with one another before the update, or contrarily, a coordinated function available before the update may become unavailable after the update.

The coordinated function management table illustrated in FIG. 3 is merely an example, and information other than file formats and coordinated functions may be associated with one another. For example, a combination of the names of plural files (file names) and a coordinated function that is executable with the contents of the plural files may be associated with one another to be registered in the coordinated function management table. In this case, the specifying unit 24 specifies the coordinated function associated with the combination of the names of the plural files by referring to the coordinated function management table.

Also, the specifying unit 24 may specify a file to which the content of the file is added based on the file name. For example, when the file name includes a character string indicating that the file incorporates the contents of files, such as the character string "ledger," "book," "integration," "management," "statistics," "graph," "table," or "list" (i.e., a file in which the contents of other files are expected or assumed to be added), the specifying unit 24 identifies the file as a destination file to which the contents of the file is added. In addition, the specifying unit 24 identifies a file having a file name that does not include the above character string for integration, and a file having a file name including a character string indicating that the file provides the contents thereof (a character string for providing contents) as files that include the contents to be added. For example, a file having a file name that includes a character string "receipt," "voucher," "personal data," "device data," or the like does not correspond to the above file for integration and is identified as a file that provides contents.

For example, in a case where document files A1 and A2 are identified as files to be subjected to coordination, when the document file A1 has a file name including the above character string for integration, and the document file A2 has a file name that does not include the character string for integration and includes a character string for providing contents, the specifying unit 24 specifies a coordinated function for writing, duplicating, and statistically processing the contents of the document file A2 for providing contents in a document file A as a coordinated function that is executable with the contents of the document files A1 and A2.

The character string for integration and the character string for providing contents may be included in attribute information of the file. In this case, the specifying unit 24 may determine whether the file corresponds to one of the files for integration and providing contents by referring to the attribute information of the file.

Further, when the names of the plural files are identical to one another, the specifying unit 24 may analyze the contents of the respective files to determine whether the files are identical to one another. When the files are not identical to one another, the specifying unit 24 determines whether to use the file for integration or for providing contents based on the analysis results of the contents. When the files are identical to one another and stored in the same folder, the controller 22 may change the name of each file so that the file names are different from each other, or overwrite the contents of one file in another file.

Hereinafter, the operation of the terminal device 10 will be described with specific examples.

For example, when the terminal device 10 acquires (collects) file A relating to a ledger (e.g., a file having a document format or a table format) and file B relating to a receipt (e.g., a file having a document format or a table format), the specifying unit 24 searches for a coordinated function that is executable with the contents of the file relating to the ledger and the contents of the file relating to the receipt in the coordinated function management table. That is, the specifying unit 24 specifies a coordinated function that is associated with a combination of the file relating to the ledger and the file relating to the receipt in the coordinated function management table. The controller 22 causes information on the coordinated function specified by the specifying unit 24 (e.g., information indicating the content and name of the coordinated function) to be displayed on the display unit of the UI unit 18. The files A and B are acquired by the terminal device 10 via an electronic mail, an SNS, a recording medium, or other methods.

Figure 4:
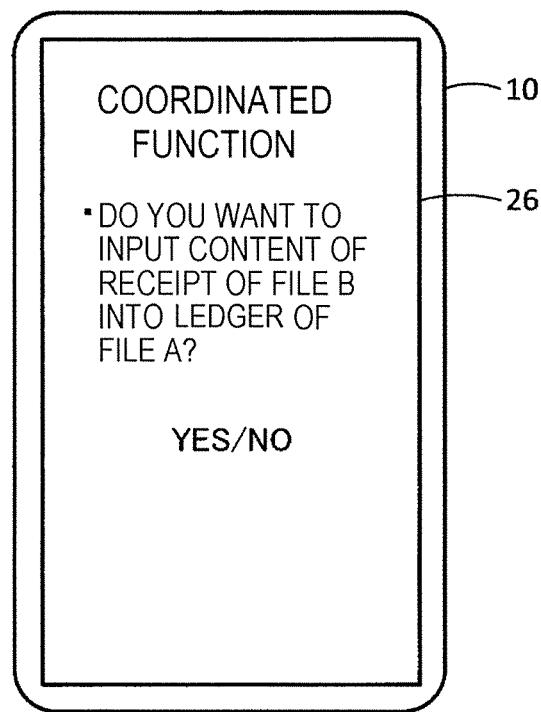
FIG. 4 is a view illustrating a screen.

FIG. 4 illustrates an example of display of information on the coordinated function. When the coordinated function that is executable with the contents of the files A and B is specified, the controller 22 causes a screen 26 to be displayed on the display unit, and causes information on the coordinated function that is executable with the contents of the files A and B to be displayed on the screen 26. For example, when the coordinated function that is executable with the contents of the files A and B is a function of "inputting the contents of the receipt of the file B into the ledger of the file A," the description of the function or the like is displayed on the screen 26. When the user presses the YES button on the screen 26, the controller 22 controls the execution of the coordinated function. For example, the controller 22 activates software for creating and editing the ledger and software for referring to the receipt, and inputs the contents of the receipt of the file B into the ledger of the file A by the function of such software. Such software may be the same software. For example, the controller 22 identifies the contents described in the receipt (e.g., expenses, etc.) using a character recognition technology, and inputs the contents of the receipt to the place corresponding to the contents in the ledger. Specifically, when the contents of the receipt are related to food expenses, the contents of the receipt are input into the item of food expenses in the ledger.

According to the present exemplary embodiment, when the terminal device 10 acquires plural files, the user is provided with a coordinated function that is executable with the contents of the plural files.

The specifying unit 24 may identify plural files acquired simultaneously by the terminal device 10 as files to be subjected to coordination, and identify plural files acquired in separate timings by the terminal device 10 as files to be subjected to coordination.

Also, when the terminal device 10 acquires three or more files, the specifying unit 24 may specify a coordinated function that is executable with the contents of two or more files among the three or more files. The specifying unit 24 may specify a coordinated function that is executable with the contents of all the files. For example, when the terminal device 10 acquires the files A, B, and C, the specifying unit 24 may specify a coordinated function that is executable with the contents of the files A, B, and C, and specify a coordinated function that is executable with the contents of two files among the files A, B, and C. Specifically, when a coordinated function that is executable with the contents of the files A and B, and a coordinated function that is executable with the contents of the files A and C are registered in the coordinated function management table, the specifying unit 24 specifies these coordinated functions as executable coordinated functions, and the controller 22 causes information on these coordinated functions to be displayed on the display unit. When a coordinated function that is executable with the contents of the files B and C is not registered in the coordinated function management table, information on the coordinated function using the contents of the files B and C is not displayed on the display unit.

When the server 14 acquires plural files, the user may be provided with a coordinated function that is executable with the contents of the files. For example, when the terminal device 10 transmits the files A and B to the server 14 and the server 14 acquires the files A and B, the specifying unit 24 provided in the server 14 specifies the coordinated function that is executable with the contents of the files A and B by referring to the coordinated function management table. The server 14 transmits information on the coordinated function to the terminal device 10 and the controller 22 of the terminal device 10 causes the information on the coordinated function to be displayed on the display unit. Further, in a case where the file A is stored in the server 14, when the terminal device 10 transmits the file B to the server 14, the coordinated function that is executable with the contents of the files A and B may be specified. The files A and B may be respectively transmitted to the server 14 from different devices or terminal devices. Also, in this case, the coordinated function that is executable with the contents of the files A and B is specified in the server 14, as described above. The information on the coordinated function may be transmitted from the server 14 to the terminal device or device that transmits the file, or to the terminal device or device that transmits the first file, the last file, or a specific file to the server 14.

Modification 1

Hereinafter, modification 1 will be described. For example, in a case where the file A is already stored in the storage unit 20 of the terminal device 10, when the terminal device 10 acquires the file B, the specifying unit 24 may specify the coordinated function that is executable with the contents of the files A and B by referring to the coordinated function management table. The information on the coordinated function is displayed on the display unit as illustrated in FIG. 4.

In a case where the file A is not stored in the storage unit 20 of the terminal device 10 and the file B is already stored in the storage unit 20, even when the terminal device 10 acquires the file A, the specifying unit 24 may specify the coordinated function that is executable with the contents of the files A and B, and the controller 22 may cause the information on the coordinated function to be displayed on the display unit, as described above.

According to modification 1, when some files among plural files to be subjected to coordination are already stored in the terminal device 10 and another file is acquired by the terminal device 10, the user is provided with a coordinated function that is executable with the contents of the plural files.

In a case where the file A is already stored in the server 14, when the terminal device 10 transmits the file B to the server 14 and the server 14 acquires the file B, the specifying unit 24 provided in the server 14 may specify the coordinated function that is executable with the contents of the files A and B by referring to the coordinated function management table. The information on the coordinated function is transmitted from the server 14 to the terminal device 10 and displayed on the display unit of the terminal device 10. Even when the file A is not stored in the server 14, the file B is stored in the server 14, and the file A is transmitted from the terminal device 10 to the server 14, the coordinated function may be specified as described above and the information on the coordinated function may be transmitted from the server 14 to the terminal device 10.

In addition, in a case where one or more files are already stored in the storage unit 20 of the terminal device 10, when the terminal device 10 acquires one or more files, the specifying unit 24 identifies a file group including one or more files stored in the storage unit 20, and one or more files acquired by the terminal device 10 as a group of candidate files for coordination. In this case, the specifying unit 24 specifies a coordinated function that is executable with the contents of two or more files included in the file group. The specifying unit 24 may specify a coordinated function that is executable with the contents of all files included in the file group.

Modification 2

Hereinafter, modification 2 will be described. For example, in a case where an image associated with the file A (e.g., an icon) is displayed on a specific screen (e.g., a desktop screen, a main screen, etc.), when the terminal device 10 acquires the file B, the specifying unit 24 may specify the coordinated function that is executable with the contents of the files A and B by referring to the coordinated function management table.

Figure 5:
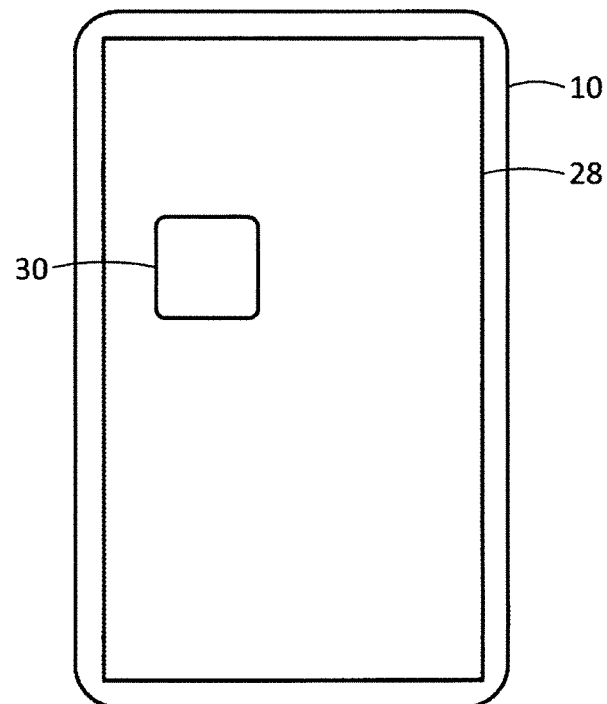
FIG. 5 is a view illustrating a screen.

As a specific example, the controller 22 causes a screen 28 functioning as a desktop screen to be displayed on the display unit, as illustrated in FIG. 5. In a case where an image 30 associated with the file A is displayed on the screen 28, when the terminal device 10 acquires the file B, the specifying unit 24 specifies the coordinated function that is executable with the contents of the files A and B, and the controller 22 causes the information on the coordinated function to be displayed on the display unit, as illustrated in FIG. 4.

In a case where an image associated with the file B is displayed on the screen 28, when the terminal device 10 acquires the file A, the specifying unit 24 may specify the coordinated function that is executable with the contents of the files A and B, and the controller 22 may cause the information on the coordinated function to be displayed on the display unit, as described above.

According to modification 2, when some files among plural files to be subjected to coordination are displayed on a specific screen and another file is acquired by the terminal device 10, the user is provided with a coordinated function that is executable with the contents of the plural files.

Further, in a case where one or more files are displayed on the screen 28, when the terminal device 10 acquires one or more files, the specifying unit 24 specifies a file group including one or more files displayed on the screen 28 and one or more files acquired by the terminal device 10 as a group of candidate files for coordination. In this case, the specifying unit 24 specifies a coordinated function that is executable with the contents of two or more files included in the file group.

Modification 3

Figure 6:
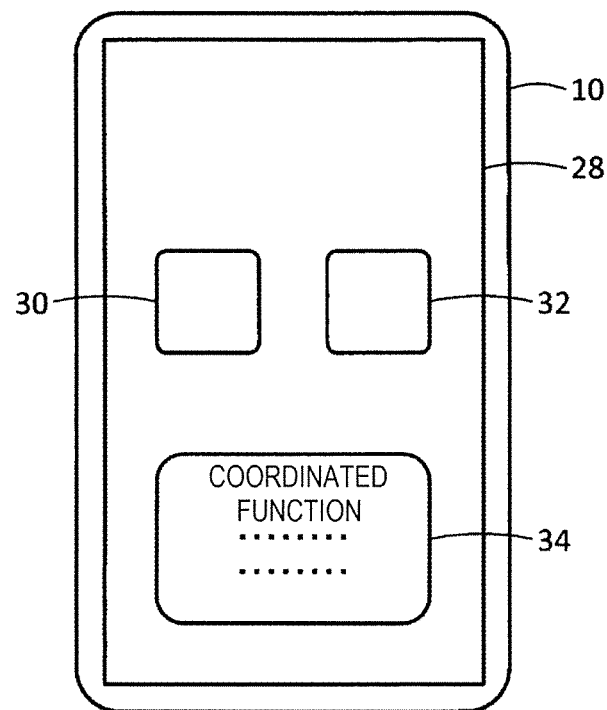
FIG. 6 is a view illustrating a screen.

Hereinafter, modification 3 will be described. When the files A and B are displayed on the same screen, the information on the coordinated function that is executable with the contents of the files A and B may be displayed. For example, as illustrated in FIG. 6, when the image 30 associated with the file A and an image 32 associated with the file B are displayed on the same screen 28, the specifying unit 24 identifies the files A and B as files to be subjected to coordination, and specifies the coordinated function that is executable with the contents of the files A and B. The controller 22 causes the information on the coordinated function to be displayed on the display unit.

For example, in a case where the image 30 associated with the file A is displayed on the screen 28, when the terminal device 10 acquires the file B, and the user causes the image 32 associated with the file B to be displayed on the screen 28 using the UI unit 18 (e.g., when an instruction is given to display the image 32 on the screen 28), the specifying unit 24 identifies the files A and B as files to be subjected to coordination. In a case where the image 32 associated with the file B is displayed on the screen 28, even when the terminal device 10 acquires the file A and the user causes the image 30 associated with the file A to be displayed on the screen 28, the files A and B are identified as the files to be subjected to coordination so that the information on the coordinated function that is executable with the contents of the files A and B is displayed. Further, in a case where the images 30 and 32 are not displayed on the screen 28, when the terminal device 10 acquires the files A and B, and the user causes the images 30 and 32 to be displayed on the screen 28 using the UI unit 18, the specifying unit 24 may identify the files A and B as files to be subjected to coordination.

As another example, in a case where the files A and B are stored in the storage unit 20 of the terminal device 10, when the user causes the images 30 and 32 to be displayed on the screen 28 using the UI unit 18 (e.g., when an instruction is given to display the images 30 and 32 on the screen 28), the specifying unit 24 may identify the files A and B as files to be subjected to coordination.

Further, when the files A and B are automatically displayed on the same screen 28 in accordance with predetermined conditions or the like instead of the user's operation, the specifying unit 24 may identify the files A and B as files to be subjected to coordination and specify the coordinated function.

The controller 22 may cause information on the coordinated function to be displayed on the screen 26, which is different from a desktop screen, as illustrated in FIG. 4, and may provide a display area 34 of the coordinated function on the screen 28 as the desktop screen so that information on the coordinated function is displayed in the display area 34, as illustrated in FIG. 6.

According to modification 3, when plural files are displayed on the same screen, the user is provided with a coordinated function that is executable with the contents of the plural files. In this manner, the coordinated function that is executable with the contents of the plural files is not notified at the stage where the terminal device 10 acquires the plural files. Therefore, it becomes difficult for information unnecessary for the user to be displayed as compared with a case where the coordinated function is always notified at the stage of acquisition.

When three or more files are displayed on the same screen (e.g., the screen 28), the specifying unit 24 identifies those three or more files as a group of candidate files for coordination, and specifies the coordinated function that is executable with the contents of two or more files included in the file group.

Modification 4

Figure 7:
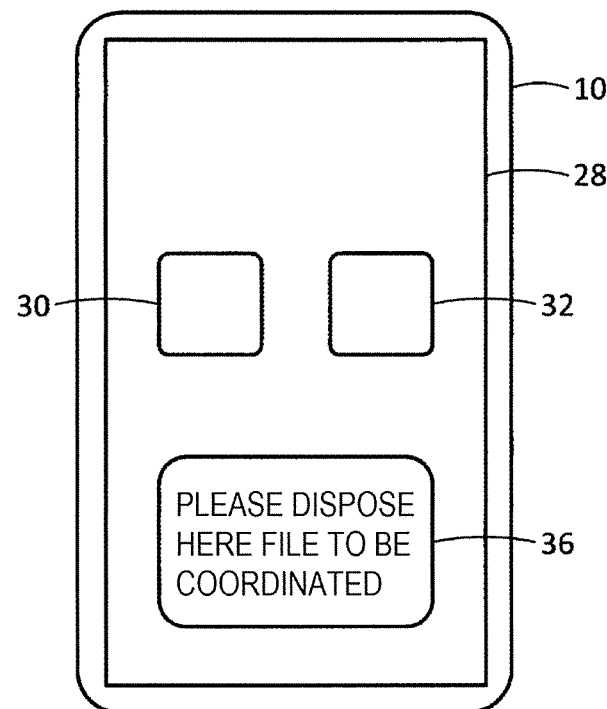
FIG. 7 is a view illustrating a screen.

Hereinafter, modification 4 will be described. As illustrated in FIG. 7, the controller 22 may cause a specific display area 36 to which the coordinated function is responsive to be displayed on the screen 28. The specifying unit 24 identifies a file associated with the image displayed in the display area 36 as a file to be subjected to coordination. For example, when the user moves the images 30 and 32 to the display area 36 using the UI unit 18, the specifying unit 24 identifies the files A and B as the files to be subjected to coordination, and specifies the coordinated function that is executable with the contents of the files A and B. The controller 22 causes the information on the coordinated function to be displayed on the display unit.

According to modification 4, plural files displayed in a specific display area are identified as files to be subjected to coordination, and the coordinated function that is executable with the contents of the plural files is provided to the user. In this manner, it becomes difficult for information unnecessary for the user to be displayed as compared with a case where the coordinated function is always notified at the stage where the plural files are acquired.

Further, when three or more files are displayed in the display area 36, the specifying unit 24 identifies those three or more files as a group of candidate files for coordination, and specifies the coordinated function that is executable with the contents of two or more files included in the file group.

Modification 5

Hereinafter, modification 5 will be described. When the files A and B are stored in the same folder (storage area), information on a coordinated function that is executable with the contents of the files A and B may be displayed. For example, in a case where the file A is already stored in a folder, when the user moves the file B to the folder using the UI unit 18, the specifying unit 24 identifies the files A and B as files to be subjected to coordination, and specifies the coordinated function that is executable with the contents of the files A and B. The controller 22 causes the information on the coordinated function to be displayed on the display unit. When the user moves a folder A to the folder in which the file B is stored using the UI unit 18, information on the coordinated function that is executable with the contents of the files A and B is also displayed as described above.

Further, when the files A and B are automatically stored in the same folder in accordance with predetermined conditions or the like instead of the user's operation, the specifying unit 24 may identify the files A and B as files to be subjected to coordination and specify the coordinated function.

According to modification 5, the user is provided with a coordinated function that is executable with the contents of plural files stored in the same folder. In this manner, it becomes difficult for information unnecessary for the user to be displayed as compared with a case where the coordinated function is always notified at the stage where the plural files are acquired.

Further, when three or more files are stored in the same folder, the specifying unit 24 identifies those three or more files as a group of candidate files for coordination, and specifies the coordinated function that is executable with the contents of two or more files included in the file group.

Modification 6

Hereinafter, modification 6 will be described. When the files A and B are stored in a specific folder to which the coordinated function is responsive (storage area), information on the coordinated function that is executable with the contents of the files A and B may be displayed. The specific folder may be specified by the user or may be predetermined.

For example, when the user moves the folders A and B to a specific folder in which the coordinated function is responsive using the UI unit 18, the specifying unit 24 identifies the files A and B as files to be subjected to coordination, and specifies the coordinated function. As another example, when the files A and B are automatically stored in a specific folder in accordance with predetermined conditions or the like instead of the user's operation, the specifying unit 24 may identify the files A and B as files to be subjected to coordination and specify the coordinated function.

According to modification 6, the user is provided with a coordinated function that is executable with the contents of the plural files stored in the specific folder to which the coordinated function is responsive. In this manner, it becomes difficult for information unnecessary for the user to be displayed as compared with a case where the coordinated function is always notified at the stage where the plural files are acquired.

Further, when three or more files are stored in a specific folder to which the coordinated function is responsive, the specifying unit 24 identifies those three or more files as a group of candidate files for coordination, and specifies the coordinated function that is executable with the contents of two or more files included in the file group.

Modification 7

Hereinafter, modification 7 will be described. The specifying unit 24 may specify a coordinated function according to the subordinate-superior relationship among plural files. For example, when the terminal device 10 acquires a file used as a superior file and a file used as a subordinate file in relation to the superior file, the specifying unit 24 identifies the superior file and the subordinate file as a file group to be subjected to coordination. The specifying unit 24 may specify a coordinated function that is executable with the contents of the superior file and the contents of the subordinate file, and the controller 22 may cause the information on the coordinated function to be displayed on the display unit.

For example, a file in which the content of another file is scheduled to be input corresponds to a superior file, and a file which is scheduled to be input into another file corresponds to a subordinate file. As a specific example, since the file A for the ledger is a file in which the content of another file (e.g., a receipt) is scheduled to be input, the file A corresponds to a superior file. Since the file B of the receipt is a file which is scheduled to be input into another file (e.g., a file for the ledger), the file B corresponds to a subordinate file.

As another example, a file whose contents themselves are editable may correspond to a superior file, and a file whose contents are not editable may correspond to a subordinate file. As an example, when the document itself displayed in a document file is editable, the document file corresponds to a superior file. In addition, when the image itself displayed in an image file is not editable (i.e., when it is possible to superimpose other contents on the image, but the image itself is not editable), the image file corresponds to a subordinate file. Of course, when a file is a document file and the document is not editable, the file corresponds to a subordinate file, and when a file is an image file and the image is editable, the file corresponds to a superior file.

The specifying unit 24 may determine whether the file falls within one of the superior file and the subordinate file based on a file name, a file format (i.e., an extension), a file attribute other than the file name (information indicating a file size, whether a file is a superior file or a subordinate file, etc.), the content of a file, and the like. For example, the specifying unit 24 identifies a file whose file name is a ledger, a form sheet, a ledger, or the like as a superior file, and identifies a file whose file name is a receipt or the like as a subordinate file.

Also, the specifying unit 24 may determine whether the file falls within one of the superior file and the subordinate file based on the relationship among the plural files to be subjected to coordination. That is, the relevance of the superior file or the subordinate file may be relatively determined.

As another example, the specifying unit 24 may identify a file having a document format, a file having a table format, a file having a sheet format, and a file having a figure format as superior files, and may identify a file having an image format, a file having a video format, and a file having a voice format as subordinate files. Of course, the specifying unit 24 may determine whether the file falls within one of the superior file and the subordinate file by determining the file individually. For example, the specifying unit 24 may determine whether the file falls within one of the superior file and the subordinate file by analyzing the content of the file.

According to modification 7, when plural files having the subordinate-superior relationship with one another are acquired by the terminal device 10, the user is provided with a coordinated function that is executable with the contents of the plural files.

In a case where the superior file is stored in the server 14, when the subordinate file is transmitted from the terminal device 10 to the server 14, the specifying unit 24 provided in the server 14 may specify a coordinated function that is executable with the content of the superior file and the content of the subordinate file. For example, in a case where the file for the ledger is stored in the server 14, when the file of the receipt is transmitted from the terminal device 10 to the server 14, the specifying unit 24 provided in the server 14 specifies a function of writing the content of the receipt in the ledger as an executable coordinated function. The same processing may be performed when the superior file is stored in the terminal device 10 and the terminal device 10 acquires the subordinate file.

Modification 7 may be applied to modification 1. For example, in a case where the superior file (e.g., file A) is stored in the storage unit 20 of the terminal device 10, when the terminal device 10 acquires a file corresponding to the subordinate file in relation to the superior file (e.g., file B), the specifying unit 24 identifies the superior file and the subordinate file as files to be subjected to coordination. In this case, the specifying unit 24 specifies a coordinated function that is executable with the contents of the superior file and the contents of the subordinate file. On the contrary, in a case where the subordinate file is stored in the storage unit 20 of the terminal device 10, even when the terminal device 10 acquires a file corresponding to the superior file in relation to the subordinate file, the specifying unit 24 may specify a coordinated function that is executable with the contents of such files.

Modification 7 may be applied to modification 2. For example, in a case where an image associated with the superior file is displayed on a specific screen, when the terminal device 10 acquires a file corresponding to the subordinate file in relation to the superior file, the specifying unit 24 identifies the superior file and the subordinate file as files to be subjected to coordination. In this case, the specifying unit 24 specifies a coordinated function that is executable with the contents of the superior file and the contents of the subordinate file. On the contrary, in a case where an image associated with the subordinate file is displayed on a specific screen, when the terminal device 10 acquires a file corresponding to the superior file in relation to the subordinate file, the specifying unit 24 may specify a coordinated function that is executable with the contents of such files.

Modification 7 may be applied to modification 3. For example, when an image associated with the superior file and an image associated with a file corresponding to the subordinate file in relation to the superior file are displayed on the same screen, the specifying unit 24 identifies the superior file and the subordinate file as files to be subjected to coordination. In this case, the specifying unit 24 specifies a coordinated function that is executable with the contents of the superior file and the contents of the subordinate file.

Modification 7 may be applied to modification 4. For example, when an image associated with the superior file and an image associated with a file corresponding to the subordinate file in relation to the superior file are displayed on a specific display area to which a coordinated function is responsive, the specifying unit 24 identifies the superior file and the subordinate file as files to be subjected to coordination. In this case, the specifying unit 24 specifies a coordinated function that is executable with the contents of the superior file and the contents of the subordinate file.

Modification 7 may be applied to modification 5. For example, when the superior file and a file corresponding to the subordinate file in relation to the superior file are stored in the same folder, the specifying unit 24 identifies the superior file and the subordinate file as files to be subjected to coordination. In this case, the specifying unit 24 specifies a coordinated function that is executable with the contents of the superior file and the contents of the subordinate file.

Modification 7 may be applied to modification 6. For example, when the superior file and a file corresponding to the subordinate file in relation to the superior file are stored in a specific folder to which a coordinated function is responsive, the specifying unit 24 identifies the superior file and the subordinate file as files to be subjected to coordination. In this case, the specifying unit 24 specifies a coordinated function that is executable with the contents of the superior file and the contents of the subordinate file.

Modification 8

Hereinafter, modification 8 will be described. In the above exemplary embodiment and modifications, the specifying unit 24 may identify a file that is a target of a coordinated function based on a file format. For example, the specifying unit 24 identifies plural files having different file formats as files that are targets of a coordinated function, and specifies a coordinated function that is executable with the contents of the plural files. For example, when the terminal device 10 acquires a group of files via an electronic mail or the like, the specifying unit 24 extracts plural files having different file formats from each other in the group of files, and specifies a coordinated function that is executable with the contents of the plural files. This is also the case when the group of files is displayed on the same screen or stored in the same folder.

Also, the specifying unit 24 may identify plural files having the same file format as files that are targets of a coordinated function, and specify a coordinated function that is executable with the contents of the plural files. For example, when the terminal device 10 acquires a group of files via an electronic mail or the like, the specifying unit 24 extracts plural files having the same file format in the group of files, and specifies a coordinated function that is executable with the contents of the plural files. This is also the case when the group of files is displayed on the same screen or stored in the same folder.

The user may set either one of a first processing in which plural files having different file formats are targets of a coordinated function, or a second processing in which plural files having the same file format are targets of a coordinated function as a processing to be executed. Also, any of the first processing and the second processing may be set to be executed in advance.

According to modification 8, the user is provided with a coordinated function that is executable with the contents of the plural files having different file formats or the contents of the plural files having the same file format.

Modification 9

Hereinafter, modification 9 will be described. The coordinated function according to modification 9 includes a process of converting the format of at least one file included in a group of files to be subjected to coordination. Specifically, the coordinated function includes a process of converting the formats of one or more files to be added into the formats of destination files, and adding the contents of one or more files to be added after conversion to the destination files. For example, when a document file and a table file are used as files to be subjected to coordination, the coordinated function that is executable with the contents of those files is a function of converting the table file into a document format (e.g., a text format or a document format) and then attaching the converted document to a document file. The coordinated function may be a function that converts a document file into a table format, and attaches the converted table to a table file.

According to modification 9, it is possible to unify the formats of plural files and to execute a coordinated function using the contents of the plural files.

Modification 10

Hereinafter, modification 10 will be described. In modification 10, when plural files are acquired and then an operation is performed to connect the plural files on a screen, information on a coordinated function executable with the contents of the plural files is displayed. Hereinafter, modification 10 will be described in detail with reference to FIG. 8.

Figure 8:
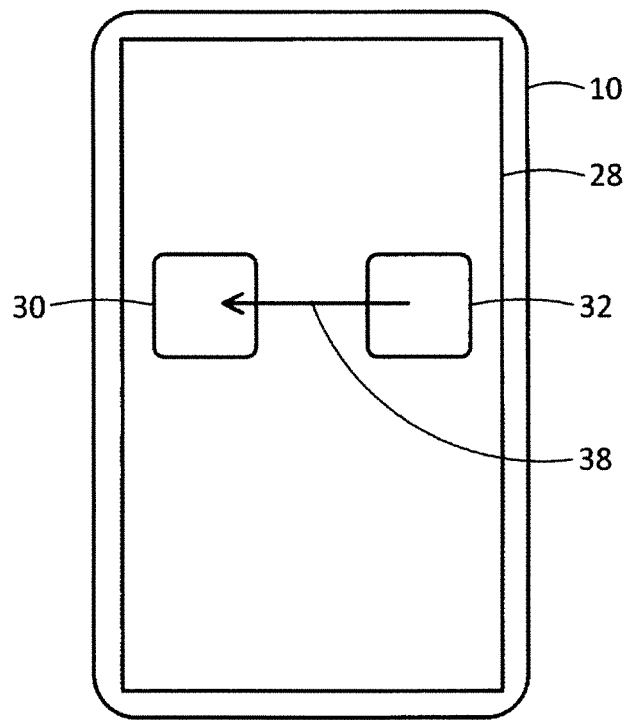
FIG. 8 is a view illustrating a screen.

FIG. 8 illustrates a screen 28. For example, the files A and B are acquired by the terminal device 10, and the image 30 associated with the file A and the image 32 associated with the file B are displayed on the screen 28.

When the user performs an operation of connecting the image 30 and the image 32 to one another on the screen 28 as indicated by an arrow 38, the specifying unit 24 identifies the file A associated with the image 30 and the file B associated with the image 32 as files to be subjected to coordination, and specifies a coordinated function that is executable with the contents of the files A and B. The controller 22 causes the information on the coordinated function to be displayed on the display unit.

For example, when a user traces plural images (images 30 and 32 in the above example) on the screen 28 with an indicator (e.g., a user's finger, a pen, a stylus, or the like) (e.g., traces plural images by touching the images displayed on the screen 28), the plural images are connected to one another. The controller 22 detects the contact of the indicator on the screen 28 and detects the movement of the indicator on the screen 28. Alternatively, the connection operation may be performed according to the user's voice instructions.

In the example illustrated in FIG. 8, the operation is performed to connect the image 32 to the image 30. Alternatively, the operation may be performed to connect the image 30 to the image 32. In any case, the files A and B are identified as files to be subjected to coordination.

Also, the specifying unit 24 may identify a file associated with the source image for the connection operation as a file for providing contents, and identify a file associated with the destination image for the connection operation as a file for integration. For example, when the user performs an operation of connecting the image 32 to the image 30, the specifying unit 24 identifies the file B associated with the image 32 as a file for providing contents, and identifies the file A associated with the image 30 as a file for integration. Then, the specifying unit 24 specifies a function of inputting the contents of the file B into the file A as a coordinated function that is executable with the contents of the files A and B.

As another example, the specifying unit 24 may identify a file associated with the source image for the connection operation as a file for integration, and identify a file associated with the destination image for the connection operation as a file for providing contents. For example, when the user performs an operation of connecting the image 30 to the image 32 (when the operation is performed in a direction opposite to the direction indicated by the arrow 38), the specifying unit 24 identifies the file B associated with the image 32 as a file for providing contents, and identifies the file A associated with the image 30 as a file for integration. Then, the specifying unit 24 specifies a function of inputting the contents of the file B into the file A as a coordinated function that is executable with the contents of the files A and B.

According to modification 10, a coordinated function is provided by a simple operation of connecting images to one another.

The specifying unit 24 may specify different coordinated functions in accordance with the order in which plural images are connected to one another. For example, when an operation is performed to connect the image 30 to the image 32, the specifying unit 24 specifies a coordinated function 1 that is executable with the contents of the files A and B, and when an operation is performed to connect the image 32 to the image 30, the specifying unit 24 specifies a coordinated function 2 that is executable with the contents of the files A and B (a function which is different from the coordinated function 1). In this case, information on the different coordinated functions is displayed according to the order in which the plural images are connected to one another. That is, the coordinated function provided to the user may be changed according to the order in which the images are connected to one another.

In addition, the specifying unit 24 may determine the priority of the coordinated function in accordance with the order in which plural images are connected to one another. For example, when an operation is performed to connect the image 30 to the image 32, the priority of the above coordinated function 1 becomes a "first place," and the priority of the above coordinated function 2 becomes a "second place." In this case, the controller 22 causes information on the coordinated function 1 to be displayed on the display unit with a higher priority (e.g., higher level) than information on the coordinated function 2. Contrarily to the above example, when an operation is performed to connect the image 32 to the image 30, the priority of the coordinated function 1 becomes a "second place," and the priority of the coordinated function 2 becomes a "first place." In this case, the controller 22 causes the information on the coordinated function 2 to be displayed on the display unit with a higher priority (e.g., higher level) than the information on the coordinated function 1. Of course, the order of priority may be the reverse of the above order.

Modification 11

Hereinafter, modification 11 will be described. In modification 11, when plural files are acquired, and the plural files are overlapped with one another on the screen, the information on the coordinated function that is executable with the contents of the plural files is displayed. Hereinafter, modification 11 will be described in detail with reference to FIG. 9.

Figure 9:
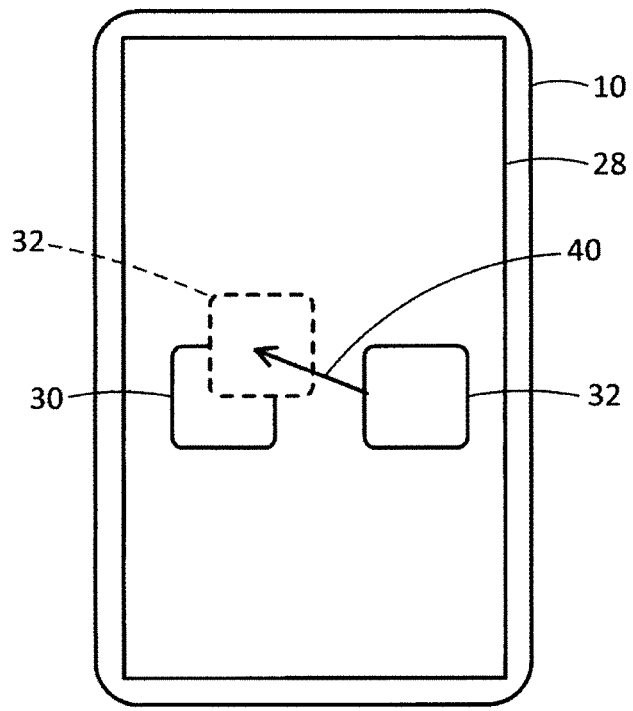
FIG. 9 is a view illustrating a screen.

FIG. 9 illustrates a screen 28. For example, the files A and B are acquired by the terminal device 10, and the image 30 associated with the file A and the image 32 associated with the file B are displayed on the screen 28.

When the user moves the image 32 to the image 30 and superimposes the image 32 on the image 30 on the screen 28 as indicated by an arrow 40, the specifying unit 24 identifies the file A associated with the image 30 and the file B associated with the image 32 as files to be subjected to coordination, and specifies the coordinated function that is executable with the contents of the files A and B. The controller 22 causes the information on the coordinated function to be displayed on the display unit.

For example, a user may drag and drop images using an indicator to overlap the images with other images. In the example illustrated in FIG. 9, the user drags the image 32 (the image 32 indicated by a broken line) and drops the image 32 at a position overlapping the image 30. The user may also perform a superimposing operation according to the user's voice instructions.

In the example illustrated in FIG. 9, the image 32 is superimposed on the image 30, but the image 30 may be superimposed on the image 32. In any case, the files A and B are identified as files to be subjected to coordination.

Further, the specifying unit 24 may identify a file associated with an image superimposed on another image as a file for providing contents and identify a file associated with an image on which other images are superimposed as a file for integration. For example, when the user superimposes the image 32 on the image 30, the specifying unit 24 identifies the file B associated with the image 32 as a file for providing contents, and identifies the file A associated with the image 30 as a file for integration. Then, the specifying unit 24 identifies a function of inputting the contents of the file B into the file A as a coordinated function that is executable with the contents of the files A and B.

As another example, the specifying unit 24 may identify a file associated with an image superimposed on another image as a file for integration, and identify a file associated with an image on which other images are superimposed, as a file for providing contents. For example, when the user superimposes the image 30 on the image 32 (when a superimposition opposite to the example illustrated in FIG. 9 is performed), the specifying unit 24 identifies the file B associated with the image 32 as a file for providing contents, and identifies the file A associated with the image 30 as a file for integration. Then, the specifying unit 24 specifies a function of inputting the contents of the file B into the file A as a coordinated function that is executable with the contents of the files A and B.

According to modification 11, a coordinated function is provided by a simple operation of superimposing images on one another.

As in the modification 10, the specifying unit 24 may specify different coordinated functions in accordance with the order in which plural images are superimposed on one another. For example, when an operation is performed to superimpose the image 30 on the image 32, the specifying unit 24 specifies a coordinated function 1 that is executable with the contents of the files A and B, and when an operation is performed to superimpose the image 32 on the image 30, the specifying unit 24 specifies a coordinated function 2 that is executable with the contents of the files A and B. In this case, information on different coordinated functions is displayed in accordance with the order in which plural images are superimposed on one another. That is, the coordinated function provided to the user may be changed according to the order in which the images are superimposed on one another.

In addition, the specifying unit 24 may determine the priority of the coordinated function in accordance with the order in which plural images are superimposed on one another. For example, when an operation is performed to superimpose the image 30 on the image 32, the priority of the above coordinated function 1 becomes a "first place," and the priority of the above coordinated function 2 becomes a "second place." In this case, the controller 22 causes information on the coordinated function 1 to be displayed on the display unit with a higher priority (e.g., higher level) than information on the coordinated function 2. Contrary to the above example, when an operation is performed to superimpose the image 32 on the image 30, the priority of the coordinated function 1 becomes a "second place," and the priority of the coordinated function 2 becomes a "first place." In this case, the controller 22 causes the information on the coordinated function 2 to be displayed on the display unit with a higher priority (e.g., higher level) than the information on the coordinated function 1. Of course, the order of priority may be the reverse of the above order.

The files to be subjected to coordination may be selected by other methods than modifications 10 and 11. For example, when a drawing operation is performed on an image associated with a file, the specifying unit 24 may identify the file as a file to be subjected to coordination. The drawing operation is, for example, an operation of enclosing an image by a circle or a rectangle, an operation of forming a dot, a line, or a check mark, or the like. Also, the specifying unit 24 may identify the file selected by the user within a predetermined time limit as a file to be subjected to coordination. The start time of the time limit is, for example, the time the first file was selected by the user. When plural images are connected to one another, the plural images are superimposed on each other, or a drawing operation is performed on the plural images within the time limit, the specifying unit 24 identifies a file associated with each of the plural images as a file to be subjected to coordination.

Further, in modifications 10 and 11, when the coordination is cancelled, the user may select, on the screen, an image associated with the file for cancellation, or press the coordination cancellation button displayed on the screen.

Modification 12

Figure 10:
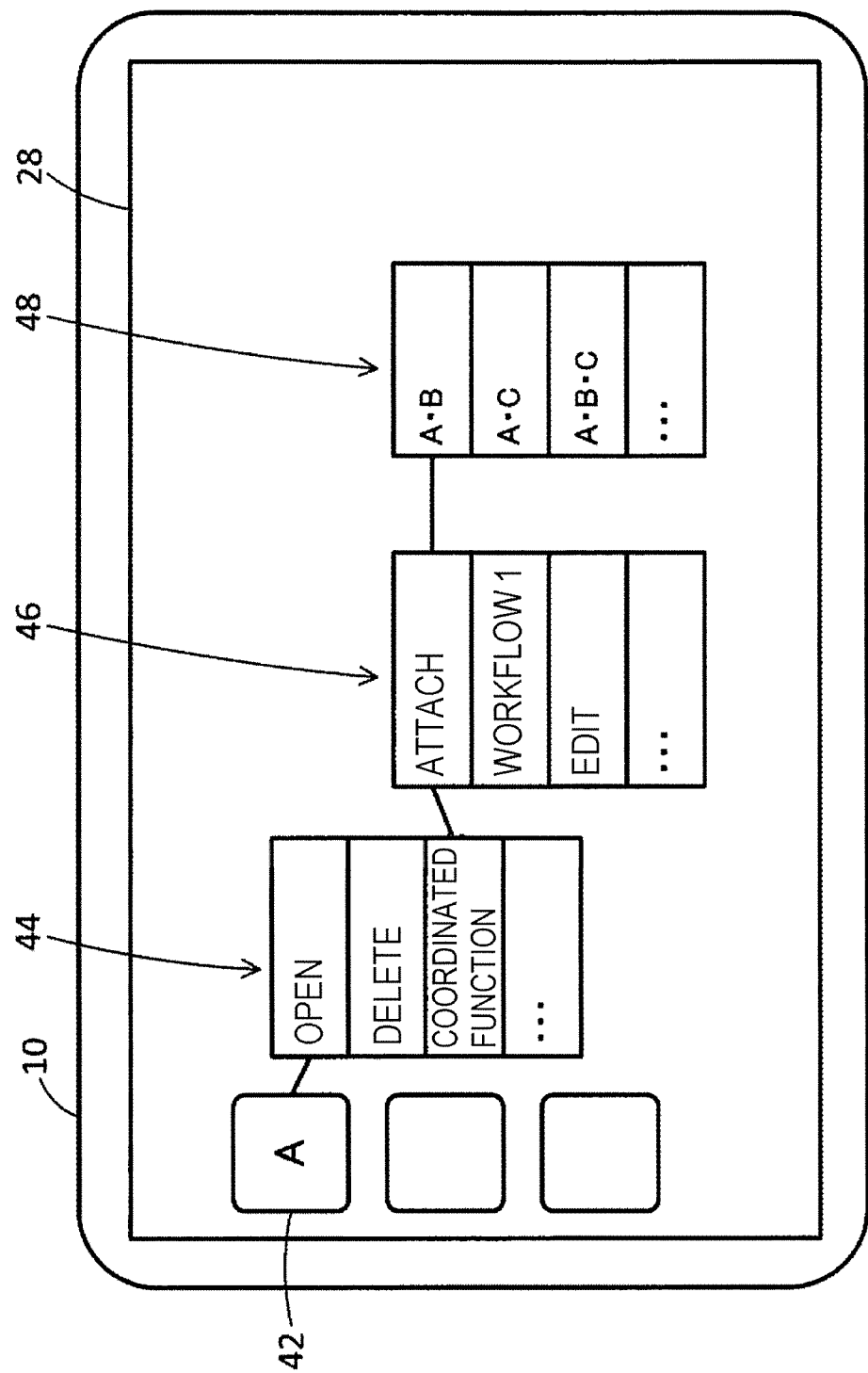
FIG. 10 is a view illustrating a screen.

Hereinafter, modification 12 will be described. When a file is specified by the user and a display instruction for the coordinated function is given, information on the coordinated function that is executable with the contents of the file may be displayed. Hereinafter, modification 12 will be described in detail with reference to FIG. 10.

Figure 12:
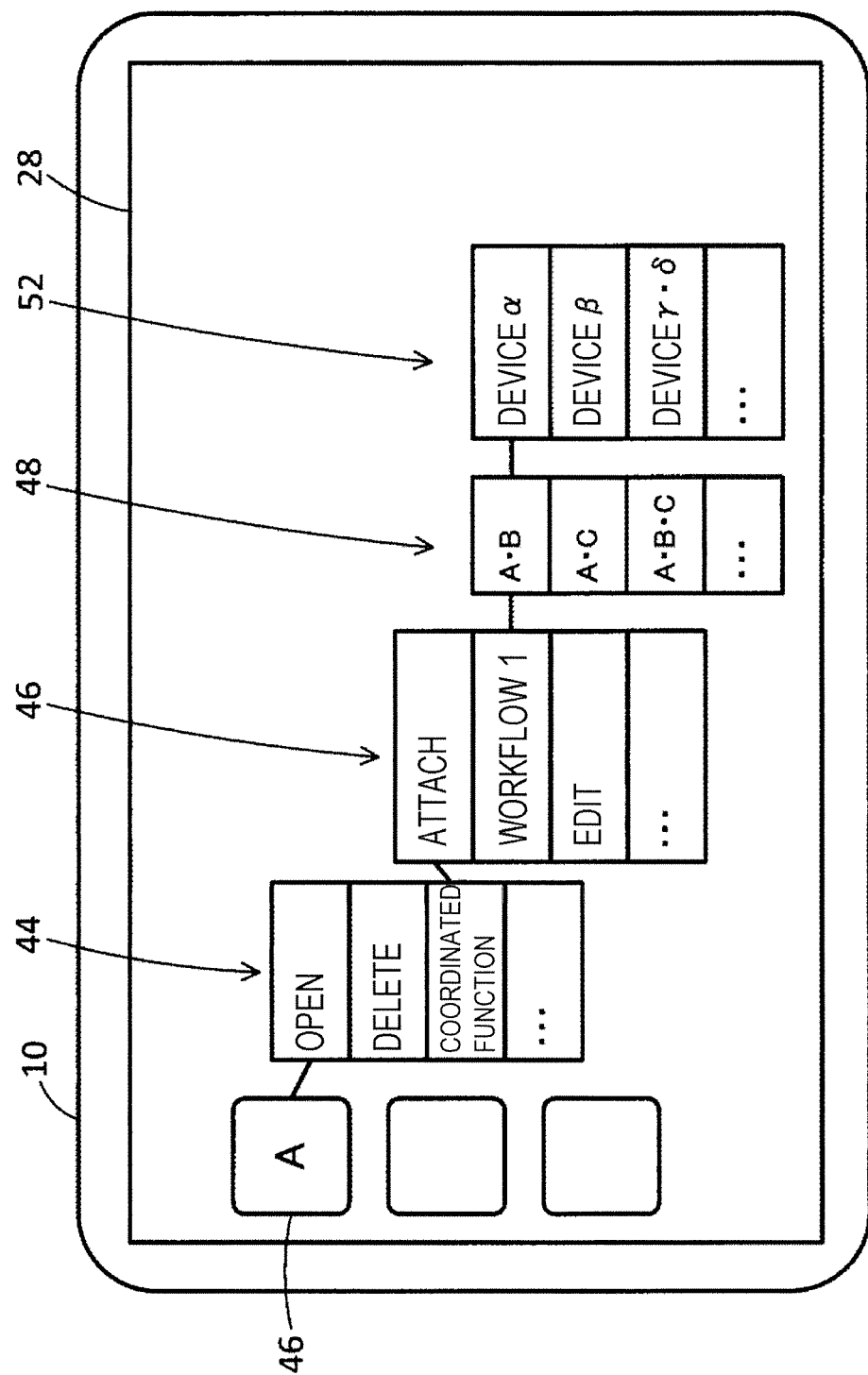
FIG. 12 is a view illustrating a screen.

FIG. 12 illustrates a screen 28. The screen 28 displays, for example, an image 42 associated with the file A, or the like. When the user designates the image 42 using the UI unit 18 and gives an instruction of displaying the menu (e.g., when a right click of a mouse is performed, etc.), the controller 22 displays a menu 44 on the screen 28. The controller 22 may display the menu 44 on the screen 28 by connecting the menu 44 with the designated image 42. Various commands are displayed in the menu 44. The user may give instructions to execute the processing associated with a command by designating the command displayed in the menu 44. For example, the menu 44 displays an "open command" of displaying the contents of the file A using application software, a "delete command" of deleting the file A, a "coordinated function command" of displaying information on the coordinated function that is executable with the contents of the file A, and the like. Of course, other commands may be included in the menu 44.

For example, when the user designates the "coordinated function command" using the UI unit 18, the controller 22 causes a coordinated function list 46 to be displayed on the screen 28 as information on the coordinated function that is executable with the contents of the file A. The coordinated function list 46 displays the names of one or more coordinated functions that are executable with the contents of the file A. Each coordinated function is specified by the specifying unit 24. That is, the specifying unit 24 specifies the coordinated function that is executable with the contents of the file A by referring to the coordinated function management table. The specifying unit 24 may specify the coordinated function that is executable with the contents of the file A in advance, or specify the coordinated function in the timing in which the file A is designated by the user or in the timing in which the "coordinated function command" is designated.

When the user selects a coordinated function from the coordinated function list 46 using the UI unit 18, the controller 22 causes a list of the files that are targets of the coordinated function (a file list 48) to be displayed together with the file A on the screen 28. The file displayed in the file list 48 may be a file stored in the storage unit 20 of the terminal device 10 or may be a file stored in an external device such as a device 12 or a server 14. For example, the specifying unit 24 specifies a file format associated with the selected coordinated function together with the file format of the file A in the coordinated function management table, and the controller 22 searches for a file having the file format and causes the name of the file to be displayed in the file list 48. Further, the specifying unit 24 may specify a file that is a target of the coordinated function together with the file A based on the name of the file A, and the controller 22 may search for the file. The name of the file searched in this manner may be displayed in the file list 48. In addition, the controller 22 may manage the history of the file used as a target of the coordinated function in the past. In this case, the controller 22 may search for the file used as a target of the selected coordinated function together with the file A in the past, and display the name of the file in the file list 48 by referring to the history information. For example, the files B and C, together with the file A, correspond to the files that are the targets of the selected coordinated function, and such names are displayed in the file list 48. As an example, information indicating a combination of the file A with other files, such as "A+B," "A+C," or "A+B+C" is displayed in the file list 48.

As described above, by displaying the information on the coordinated function as in the coordinated function list 46, the user is provided with information on the coordinated function that is executable with the contents of the file designated by the user. By displaying information on the file as in the file list 48, the user is provided with the file designated by the user and information on the file that is a target of a coordinated function.

For example, when the user selects a file from the file list 48 using the UI unit 18, the controller 22 may execute a coordinated function that is selected by the user from the coordinated function list 46 with respect to the file group selected by the user. For example, when the files A, B, and C are selected by the user from the file list 48, the controller 22 executes a coordinated function that is selected by the user from the coordinated function list 46 with respect to the files A, B, and C.

Figure 11:
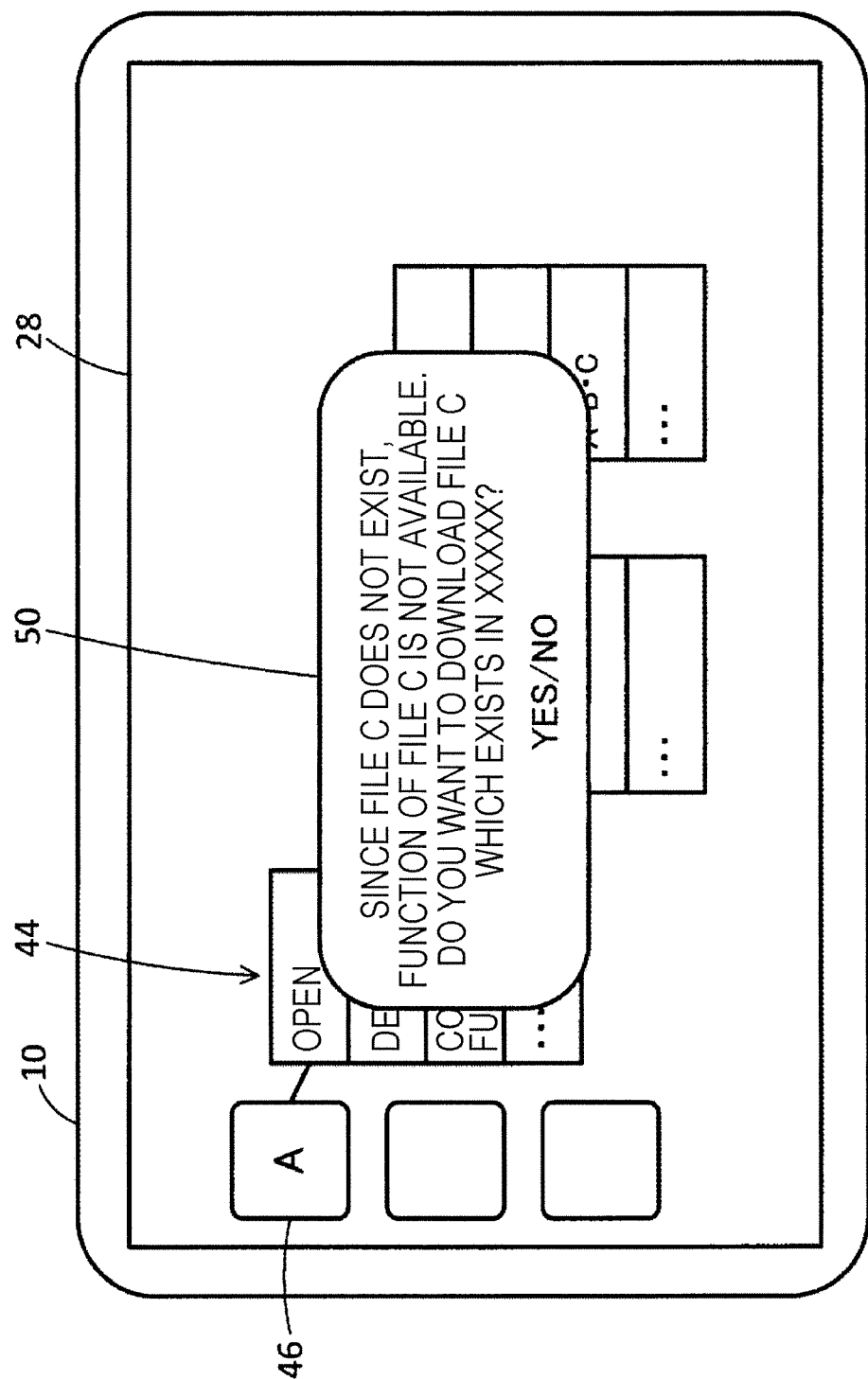
FIG. 11 is a view illustrating a screen.

In a case where the file that was used in the past together with the file A as a target of the selected coordinated function (e.g., the file C) is selected by the user from the file list 48, when the file C does not exist in a storage location when it was used in the past as a target of the coordinated function, the controller 22 may cause information for prompting the user to acquire the file C to be displayed on the screen 28. The storage location may be the storage unit 20 of the terminal device 10, or a storage device provided in an external device such as the device 12 or the server 14. For example, as illustrated in FIG. 11, the controller 22 causes a message 50 to be displayed on a screen 28. The message 50 includes a message indicating that the linkage function is not executable because the file C does not exist in the original storage location and a message for asking the user whether the file C needs to be acquired (e.g., downloaded). When the user presses the YES button in the message 50 using the UI unit 18, the controller 22 searches for the file C. For example, when the file C was originally stored in the server 14 but is not stored in the server 14 at the present time, the controller 22 searches for the file C in the storage location other than the server 14 (e.g., the terminal device 10 or an external device such as the device 12). For example, when the file is stored in the storage location XXXXX, the controller 22 acquires the file C from the storage location XXXXX and executes the coordinated function selected by the user using the contents of the files A and C.

In addition, when the user selects the coordinated function from the coordinated function list 46, the controller 22 may acquire the file that is a target of the coordinated function together with the file A. To explain using the above example, in a case where the user selects a coordinated function using the contents of the file C, when the file C is not stored in the original storage location, the controller 22 searches for the file C and acquires the file C from the current storage location. When receiving the instruction to execute the coordinated function from the user or not receiving the instruction, the controller 22 may execute the coordinated function using the contents of the files A and C.

As described above, even when the file required for the coordinated function does not exist in the original storage location, the file may be searched and the coordinated function may be executed.

Modification 13

Hereinafter, modification 13 will be described. In modification 13, the user is notified of a device that executes the coordinated function. Hereinafter, modification 13 will be described in detail with reference to FIG. 12.

FIG. 12 illustrates a screen 28. For example, when the user selects a coordinated function from the coordinated function list 46 using the UI unit 18 and selects a file from the file list 48, the controller 22 causes a list of devices for executing the coordinated function (a device list 52) to be displayed on the screen 28. As a specific example, when the coordinated function "workflow 1" is selected from the coordinated function list 46 and the files A and B are selected from the file list 48, the controller 22 causes the name of the device for executing the coordinated function "workflow 1" to be displayed in the device list 52. Each device is specified by the specifying unit 24. That is, the specifying unit 24 specifies a device for executing the coordinated function "workflow 1" by referring to the coordinated function management table (a table including device identification information indicating a device used for the coordinated function). For example, the coordinated function "workflow 1" is a function that is executable by a single device α, a single device β, or a combination of devices γ and δ, and the names of the devices are displayed in the device list 52.

Further, at a stage where the user selects the coordinated function from the coordinated function list 46, the controller 22 may cause a list of devices for executing the selected coordinated function (a device list 52) to be displayed on the screen 28.

The controller 22 may acquire information indicating the performance of each device from each device, the server 14, or the like, and display the name of each device to be displayed in the device list 52 in accordance with the display order corresponding to the performance of each device. For example, the controller 22 causes the device whose processing speed is higher to be displayed in a higher level of the device list 52.

The controller 22 may also cause a list of software for executing the coordinated function selected by the user (a software list) to be displayed on the screen 28. Each software is specified by the specifying unit 24. That is, the specifying unit 24 specifies the software for executing the coordinated function selected by the user by referring to the coordinated function management table (the table including the software identification information indicating the software used for the coordinated function). Also, in this case, the controller 22 may cause the name of each software to be displayed in the software list in accordance with the display order corresponding to the performance of each software. Further, when the software for executing the coordinated function is not installed in the terminal device 10, the controller 22 may cause a message indicating that such software is not installed in the terminal device 10, a message for prompting the user to download the software, or the like to be displayed on the screen 28. The controller 22 may acquire the software automatically or according to the user's instructions. For example, the controller 22 downloads the software from the external device such as the server 14.

When both the device and the software are necessary to execute the coordinated function selected by the user, the controller 22 may cause a list of devices and software for executing the coordinated function to be displayed on the screen 28. The specifying unit 24 specifies the device and software for executing the coordinated function selected by the user by referring to the coordinated function management table (the table including the identification information indicating the device and the software used for the coordinated function). Also, in this case, the controller 22 may cause the names of each device and each software to be displayed in the list in accordance with the display order corresponding to the performance of each device and each software.

According to modification 13, the information of the device and software used for the coordinated function is provided to the user.

The controller 22 may acquire information indicating the status of each device and notify the user of the status of the device. The controller 22 periodically acquires information indicating the status of the device in the timing designated by the user, the timing in which the device is designated by the user, or the timing in which the coordinated function is designated by the user. The controller 22 may acquire status information from each device or may acquire status information from the server 14 when the status information of each device is managed by the server 14. The status of the device is in use, not in use, in failure, during maintenance, power off, or the like.

Figure 13:
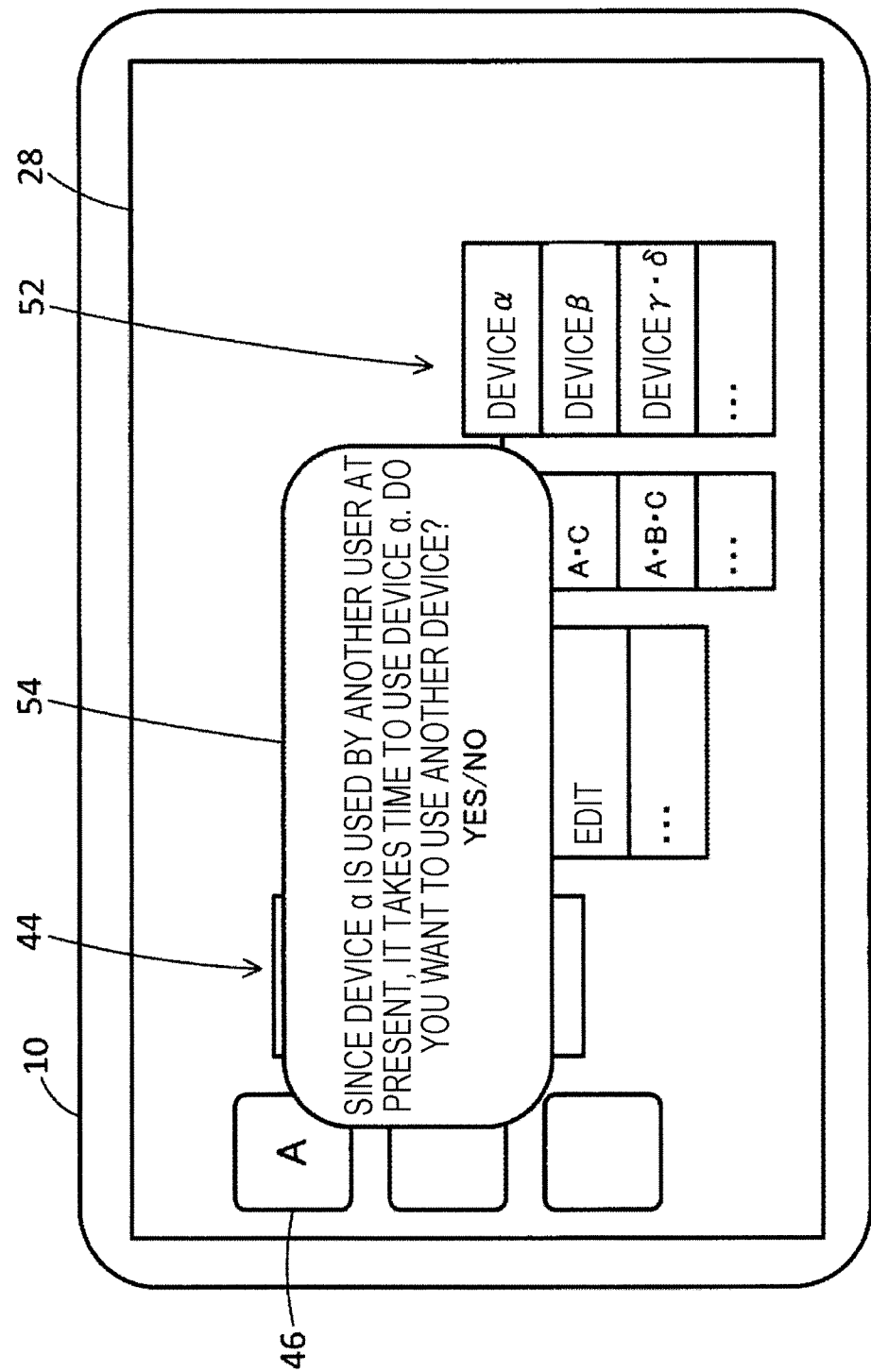
FIG. 13 is a view illustrating a screen.

Hereinafter, the status notification will be described in detail with reference to FIG. 13. For example, in a case where the user selects the device α from the device list 52 using the UI unit 18, when the device α is used by another user and the device α may not be used at present, the controller 22 causes a message 54 indicating this to be displayed on the screen 28. When the user selects a device other than the device α and the device is usable, the controller 22 causes the coordinated function selected by the user to be executed on the device automatically or according to the user's instructions. Further, when a device other than the device α is not selected by the user and the device α becomes usable, the controller 22 may cause the coordinated function selected by the user to be executed on the device α automatically or according to the user's instructions. When the device α is usable, the controller 22 may cause a message indicating this to be displayed on the screen 28.

Also, when some of the functions of the device α selected by the user are in use but the coordinated function selected by the user is executable, the controller 22 may cause the coordinated function to be executed on the device α. For example, it is assumed that the device α is a multifunction device that has a scanning function, a printing function, and a copying function, and the coordinated function selected by the user includes a scanning function. When the device α is executing the printing function but the scanning function may be executed separately during the execution of the printing function, the controller 22 may cause the scanning function included in the coordinated function to be executed on the device α.

Even when the user does not select a device from the device list 52, the controller 22 may cause the status information of each device to be displayed on the screen 28. In this manner, it becomes easier for the user to select the device that the user may use.

Modification 14

Hereinafter, modification 14 will be described. In modification 14, when plural files are acquired from plural users, information on the coordinated function that is executable with the contents of the plural files is displayed. The coordinated function may be changed according to the user from which the file is acquired. Hereinafter, modification 14 will be described in detail with reference to FIG. 14.

FIG. 14 illustrates an example of a coordinated function management table according to modification 14. In the coordinated function management table, information for identifying the user (user identification information), information for identifying the file acquired from the user (file identification information), and information indicating the coordinated functions that are executable with the contents of plural files (coordinated function information) are associated with one another. The user herein may indicate an actual person or a user account. That is, when the users are the same person but have plural different user accounts, the plural user accounts are identified as separate users. As a specific example, the users A and B are physically the same person, but may indicate plural user accounts possessed by the person or may indicate physically different people.

The contents illustrated in FIG. 14 will be described in detail. For example, when a file 1 is acquired from the user A and a file 2 is acquired from the user B, the coordinated function that is executable with the files 1 and 2 is a coordinated function 1. In addition, when the file 2 is acquired from the user A and the file 1 is acquired from the user B, the coordinated function that is executable with the files 1 and 2 is a coordinated function 2. That is, when the files that are targets of the coordinated function are the same, but the users as the acquisition sources are different, different coordinated functions may be executed. Of course, even when the users as the acquisition sources are different, the same coordinated function may be executed. In addition, when a file 3 is acquired from the user A and a file 4 is acquired from the user B, the coordinated function that is executable with the files 3 and 4 is a coordinated function 3.

Hereinafter, modification 14 will be described in more detail. For example, when the file 1 is transmitted from the terminal device 10 of the user A to the server 14, and the file 2 is transmitted from the terminal device 10 of the user B to the server 14, the specifying unit 24 provided in the server 14 identifies the files 1 and 2 as files that are targets of the coordinated function, and specifies the coordinated function 1 that is executable with the files 1 and 2. The information on the coordinated function 1 may be transmitted to and displayed on the respective terminal devices 10 of the users A and B, or any one of the terminal devices 10. As described above, the users A and B are physically the same person and may indicate plural different user accounts.

When the terminal device 10 of the user A acquires the file 1 as a file of the user A and acquires the file 2 from the terminal device 10 of the user B, the specifying unit 24 of the terminal device 10 of the user A specifies the coordinated function 1 that is executable with the contents of the files 1 and 2. The information on the coordinated function 1 is displayed on the display unit of the terminal device 10 of the user A. Of course, the information may be displayed on the display unit of the terminal device 10 of the user B.

Further, modification 14 may be applied to modification 5. That is, when plural files acquired from plural users are stored in the same folder, a coordinated function that is executable with the contents of the plural files may be notified. The folder may be a folder provided in the terminal device 10, a folder provided in the device 12, or a folder provided in the server 14.

Further, modification 14 may be applied to modification 6. That is, when plural files acquired from plural users are stored in a specific folder, a coordinated function that is executable with the contents of the plural files may be notified. The folder may be a folder provided in the terminal device 10, a folder provided in the device 12, or a folder provided in the server 14.

When plural files are stored in the same specific folder, the coordinated function may be notified, or when each of the plural files is stored in a separate specific folder, the coordinated function may be notified. As a specific example, when the file 1 from the user A and the file 2 from the user B are stored in the same specific folder X, the coordinated function 1 may be notified. As another example, when the file 1 from the user A is stored in a specific folder Y and the file 2 from the user B is stored in a specific folder Z, the coordinated function 1 may be notified.

Also, the coordinated function may be changed according to the folder of the storage location. That is, when the folder in which the file is stored is different, the notified coordinated function may also be changed. For example, when the folder in which the acquired file is stored differs in the terminal device 10 of each user, the notified coordinated function is also changed.

In addition, when plural files are acquired by plural users, the coordinated function that is executable with the contents of the plural files may be notified. For example, when the terminal device 10 of the user A acquires the file 1 and the terminal device 10 of the user B acquires the file 2, information on the coordinated function 1 that is executable with the contents of the files 1 and 2 is displayed on the respective terminal devices 10 of the users A and B, or any one of the terminal devices 10. The specification processing of the coordinated function is performed by any of the terminal devices 10 of the users A and B. In addition, the coordinated function may be changed in accordance with the folder in which the file is stored in the terminal device 10 of each user. That is, when the folder of the file storage location is changed in the terminal device 10 of each user, the coordinated function may be changed in accordance with the change.

Modification 15

Hereinafter, modification 15 will be described. The priority of the notification of the coordinated function may be changed according to the order in which plural files are acquired. The coordinated function to be executed may also be changed.

FIG. 15 illustrates an example of a coordinated function management table according to modification 15. As an example, in the coordinated function management table, information indicating a combination of file formats, information indicating the order in which the files are acquired, and information indicating the coordinated function and the priority (coordinated function information) are associated with one another. The acquisition order is the order in which the files are acquired, and is, for example, the order in which the terminal device 10 or the server 14 acquires the files, the order in which the files are displayed on the same screen, the order in which the files are stored in the same folder, the order in which the files are displayed in a specific display area, the order in which the files are stored in a specific folder, and the like. For example, when the terminal device 10 acquires plural files in order, the order of acquiring the files corresponds to an "acquisition order." The priority is a priority of display of information on the coordinated function.

For example, the coordinated functions that are associated with a combination of a document format and an image format are a "function of inserting an image into a document" and a "function of superimposing a document on an image."

For example, when each file is acquired by the terminal device 10 in the order of the document file and the image file, the order of acquisition of the document file is a first place, and the order of acquisition of the image file is a second place. In this case, the priority of the "function of superimposing a document on an image" becomes the first place, and the priority of the "function of inserting an image into a document" becomes the second place. That is, the priority of the coordinated function to add the contents of the previously acquired file to the later acquired file becomes higher than the priority of the coordinated function to add the contents of the later acquired file to the previously acquired file. In this case, the information on the "function of superimposing a document on an image" is displayed with a higher priority than the information on the "function of inserting an image into a document." For example, information on the "function of superimposing a document on an image" is displayed above or prior to information on the "function of inserting an image into a document." Of course, the priority described above may be reversed.

Conversely, when each file is acquired by the terminal device 10 in the order of the image file and the document file, the acquisition order of the image file is a first place, and the acquisition order of the document file is a second place. In this case, the priority of the "function of inserting an image into a document" becomes the first place, and the priority of the "function of superimposing a document on an image" becomes the second place. In this case, the information on the "function of inserting an image into a document" is displayed with a higher priority than the information on the "function of superimposing a document on an image." For example, the information on the "function of inserting an image into a document" is displayed above or prior to the information on the "function of superimposing a document on an image."

According to modification 15, it is possible to appropriately inform the user of a function having plural options.

Also, when plural files are acquired by plural users, the priority of the coordinated function may be changed according to the order in which each user acquires the file.

The above terminal device 10 is implemented by, for example, cooperation between hardware and software. Specifically, the terminal device 10 includes one or more processors such as a CPU (not illustrated). The function of each portion of the terminal device 10 is implemented by the one or more processors reading and executing the program stored in a storage device (not illustrated). The above program is stored in a storage device via a recording medium such as a CD or a DVD, or via a communication path such as a network. As another example, each portion of the terminal device 10 may be implemented by hardware resources such as, for example, a processor, an electronic circuit, or an application specific integrated circuit (ASIC). Devices such as memories may be used for such an implementation. As still another example, each portion of the terminal device may be implemented by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a memory that stores a coordinated function management table comprising information indicating different combinations of a plurality of file formats, information indicating a coordinated function that is executable with each combination of the file formats, and information indicating a device combination including at least one device for executing the coordinated function with the each combination of the file formats; and
 a processor, configured to:
  display a plurality of images on a user interface;
  receive an operation performed by a user on a designated image, among the plurality of images on the user interface, associated with a designated file; and
  in response to the operation being an instruction related to an execution of a coordinated function,
   determine and display a list of candidates comprising at least one candidate coordinated function which is executable by using the designated file on the user interface, receive a selection on a target coordinated function among the list of candidates from the user on the user interface, determine and display a list of files, which are different from the designated file, used for executing the target coordinated function along with the designated file on the user interface according to the coordinated function management table, receive a selection on a first file among the list of files used for executing the target coordinated function along with the designated file from the user on the user interface, determine and display a list of devices, comprising at least one device combination, for executing the target coordinated function with the first file and the designated file on the user interface according to the coordinated function management table, receive a selection on a target device combination among the list of devices from the user on the user interface, and execute the target coordinated function with the first file and the designated file by using at least one device included in the target device combination.

2. The information processing apparatus according to claim 1,
wherein the processor displays the list of files used for executing the target coordinated function based on history information of the user.

3. The information processing apparatus according to claim 1,
wherein the processor searches for a file used together with the designated file for executing the target coordinated function in the past and causes a name of the searched file to be displayed in the list of files.

4. The information processing apparatus according to claim 1,
wherein the first file is stored in a terminal device of the user.

5. The information processing apparatus according to claim 1,
wherein the first file is stored in an external device other than a terminal device of the user.

6. The information processing apparatus according to claim 1, wherein the processor is further configured to:
in response to the first file used together with the designated file for executing the target coordinated function in the past, and in response to the first file not existing in a previous storage location when the first file was used in the past,
display a message indicating that the target coordinated function is not executable.

7. The information processing apparatus according to claim 1, wherein the processor is further configured to:
in response to the first file used together with the designated file for executing the target coordinated function in the past, and in response to the first file not existing in a previous storage location when the first file was used in the past,
display a message inquiring the user whether to search for the first file from at least one other storage location.

8. The information processing apparatus according to claim 7, wherein the processor is further configured to:
in response to the first file being searched out from a first storage location among the at least one other location, download the first file from the first storage location.

9. The information processing apparatus according to claim 1,
wherein the processor searches for a file having a specific file format and causes a name of the searched file to be displayed in the list of files.

10. The information processing apparatus according to claim 1, wherein the processor is further configured to:
display a list of commands to execute processing by using the designated file, wherein the list of commands comprises a coordinated function command.

11. An information processing method comprising:
storing a coordinated function management table comprising information indicating different combinations of a plurality of file formats, information indicating a coordinated function that is executable with each combination of the file formats, and information indicating a device combination including at least one device for executing the coordinated function with the each combination of the file formats in a memory;
displaying a plurality of images on a user interface;
receiving an operation performed by a user on a designated image, among the plurality of images on the user interface, associated with a designated file; and
in response to the operation being an instruction related to an execution of a coordinated function,
determining and displaying a list of candidates comprising at least one candidate coordinated function which is executable by using the designated file on the user interface,
receiving a selection on a target coordinated function among the list of candidates from the user on the user interface,
determining and displaying a list of files, which are different from the designated file, used for executing the target coordinated function along with the designated file on the user interface according to the coordinated function management table,
receiving a selection on a first file among the list of files used for executing the target coordinated function along with the designated file from the user on the user interface,
determining and displaying a list of devices, comprising at least one device combination, for executing the target coordinated function with the first file and the designated file on the user interface according to the coordinated function management table,
receiving a selection on a target device combination among the list of devices from the user on the user interface, and
executing the target coordinated function with the first file and the designated file by using at least one device included in the target device combination.

12. The information processing method according to claim 11,
wherein the list of files used for executing the target coordinated function is displayed based on history information of the user.

13. The information processing method according to claim 11 further comprising:
in response to the first file used together with the designated file for executing the target coordinated function in the past, and in response to the first file not existing in a previous storage location when the first file was used in the past,
displaying a message indicating that the target coordinated function is not executable.

14. The information processing method according to claim 11 further comprising:

in response to the first file used together with the designated file for executing the target coordinated function in the past, and in response to the first file not existing in a previous storage location when the first file was used in the past, displaying a message inquiring the user whether to search for the first file from at least one other storage location.

15. The information processing method according to claim 14 further comprising:

in response to the first file being searched out from a first storage location among the at least one other location, downloading the first file from the first storage location.

16. A non-transitory computer readable medium storing a program causing a computer to execute information processing, the information processing comprising:

storing a coordinated function management table comprising information indicating different combinations of a plurality of file formats, information indicating a coordinated function that is executable with each combination of the file formats, and information indicating a device combination including at least one device for executing the coordinated function with the each combination of the file formats in a memory;

displaying a plurality of images on a user interface;

receiving an operation performed by a user on an image a designated image, among the plurality of images on the user interface, associated with a designated file; and in response to the operation being an instruction related to an execution of a coordinated function, determining and displaying a list of candidates comprising at least one candidate coordinated function which is executable by using the designated file on the user interface, receiving a selection on a target coordinated function among the list of candidates from the user on the user interface, determining and displaying a list of files, which are different from the designated file, used for executing the target coordinated function along with the designated file on the user interface according to the coordinated function management table receiving a selection on a first file among the list of files used for executing the target coordinated function along with the designated file from the user on the user interface, determining and displaying a list of devices, comprising at least one device combination, for executing the target coordinated function with the first file and the designated file on the user interface according to the coordinated function management table, receiving a selection on a target device combination among the list of devices from the user on the user interface, and executing the target coordinated function with the first file and the designated file by using at least one device included in the target device combination.

\* \* \* \* \*